United States Patent [19]
Takayanagi et al.

[11] Patent Number: 5,184,178
[45] Date of Patent: Feb. 2, 1993

[54] IMAGE RECORDING APPARATUS HAVING AN INTERCHANGEABLE CARTRIDGE

[75] Inventors: Yoshiaki Takayanagi; Hiromitsu Hirabayashi, both of Yokohama, Japan

[73] Assignee: Canon Kabushiki Kaisha, Tokyo, Japan

[21] Appl. No.: 771,866

[22] Filed: Oct. 8, 1991

Related U.S. Application Data

[63] Continuation of Ser. No. 404,851, Sep. 8, 1989, abandoned.

[30] Foreign Application Priority Data

Sep. 13, 1988 [JP] Japan .................................. 63-229567
Sep. 13, 1988 [JP] Japan .................................. 63-229568

[51] Int. Cl.$^5$ .......................................... G03G 21/00
[52] U.S. Cl. ............................. 355/202; 346/76 PH; 355/210
[58] Field of Search ............... 355/200, 202, 208, 210, 355/211, 260; 346/76 PH; 358/296, 300, 400, 401, 461

[56] References Cited

U.S. PATENT DOCUMENTS

| | | | |
|---|---|---|---|
| 4,803,521 | 2/1989 | Honda | 355/206 |
| 4,933,718 | 6/1990 | Furuya | 355/203 |
| 4,939,541 | 7/1990 | Sugiura | 355/210 X |
| 4,952,974 | 8/1990 | Mori | 355/200 |
| 4,978,995 | 12/1990 | Takahashi | 355/206 |

Primary Examiner—A. T. Grimley
Assistant Examiner—Christopher Horgan
Attorney, Agent, or Firm—Fitzpatrick, Cella, Harper & Scinto

[57] ABSTRACT

An image recording apparatus capable of achieving multiple functions by selectively mounting plural cartridges. There are provided a first cartridge equipped with a recording mechanism for electrophotographically recording an image, and a second cartridge equipped with another recording mechanism for image recording with a different process. A part of the apparatus is commonly utilized for image recording when the first or second cartridge is mounted.

17 Claims, 36 Drawing Sheets

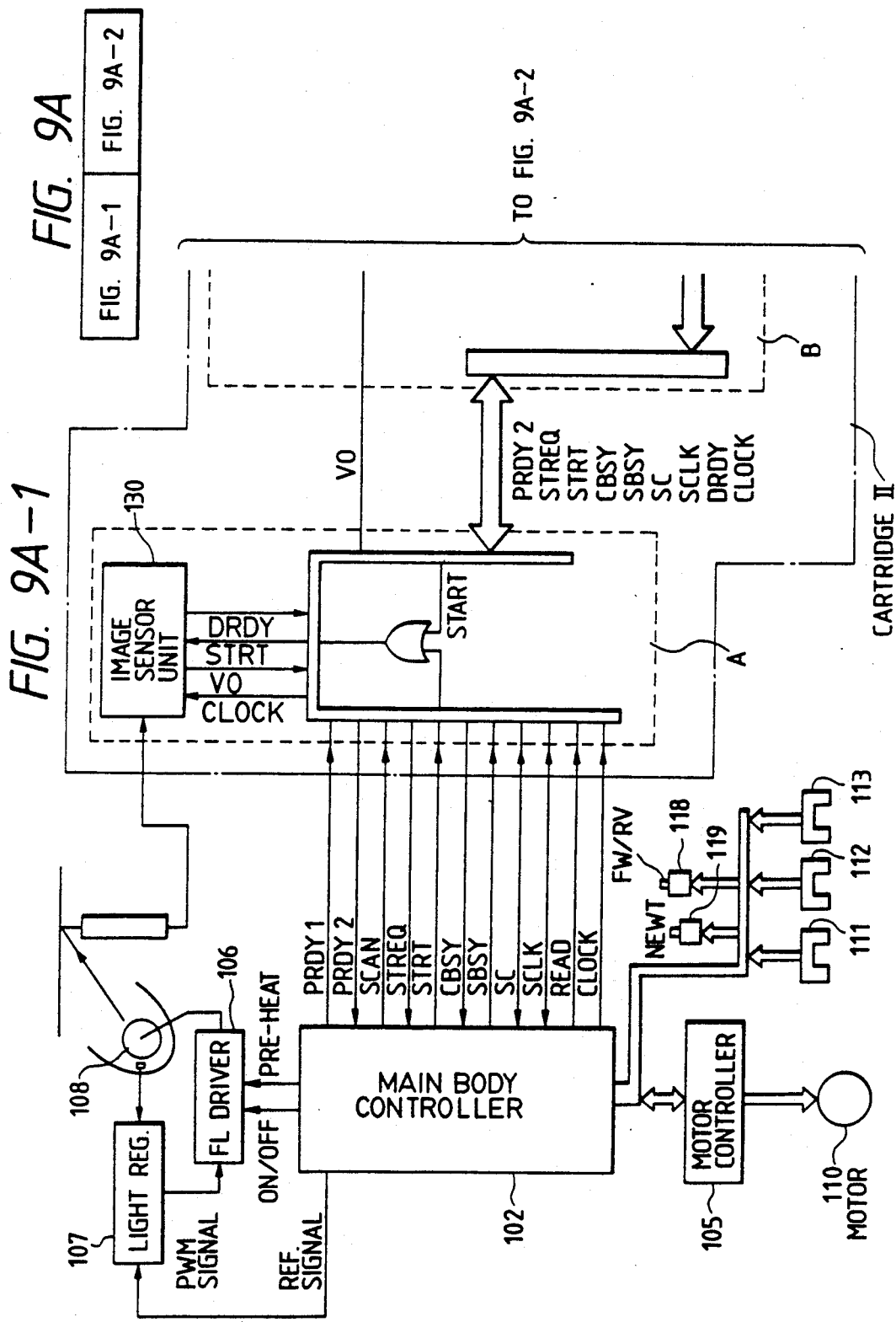

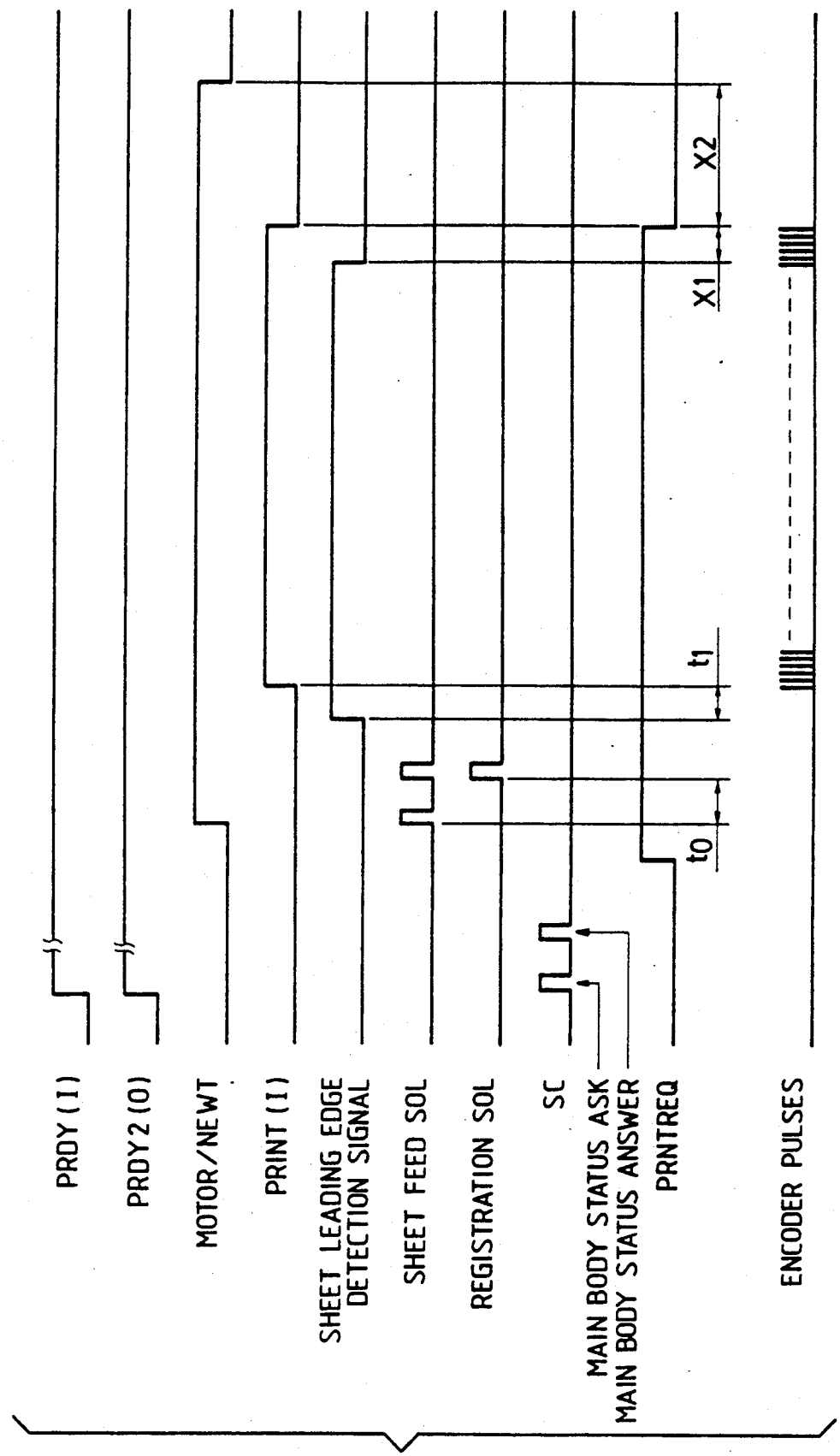

FIG. 14A

| ABBREVIATION OF COMMAND | COMMAND CODE | FUNCTION |
|---|---|---|
| SR 0 | 01 | STATUS 0 REQUIREMENT |
| SR 1 | 02 | STATUS 1 REQUIREMENT |
| SR 2 | 03 | STATUS 2 REQUIREMENT |
| SR 3 | 10 | SCLK EXTERNAL DESIGNATION |
| EC 0 | 11 | SCLK INTERNAL DESIGNATION |
| EC 1 | 12 | ORIGINAL SCAN COMMAND |
| EC 2 | 04 | STATUS 3 REQUIREMENT |

\* SR: STATUS REQUEST
  EX: EXECUTE COMMAND

FIG. 14B

< STATUS 0 >

| BIT POSITION | | STATUS |
|---|---|---|
| BIT 0 | 0 | NO JAM |
| | 1 | JAM PRESENCE |
| BIT 1 | 0 | TRANSFER SHEET PRESENCE |
| | 1 | NO TRANSFER SHEET |
| BIT 2 | 0 | HEATER TEMP<T |
| | 1 | HEATER TEMP>T |
| BIT 3 | 0 | — |
| | 1 | HEATER ABNORMAL |
| BIT 4 | 0 | — |
| | 1 | MOTOR ABNORMAL |
| BIT 5 | 0 | |
| | 1 | |
| BIT 6 | 0 | |
| | 1 | |
| BIT 7 | 0 | PARITY BIT |
| | 1 | PARITY BIT |

FIG. 14C

⟨ STATUS 1 ⟩

| BIT POSITION | | STATUS |
|---|---|---|
| BIT 0 | 0 | ORIGINAL MOVEMENT: NORMAL |
| | 1 | ORIGINAL MOVEMENT: ABNORMAL |
| BIT 1 | 0 | LIGHT QUANTITY: NORMAL |
| | 1 | LIGHT QUANTITY: ABNORMAL |
| BIT 2 | 0 | — |
| | 1 | SHADING OK |
| BIT 3 | 0 | |
| | 1 | |
| BIT 4 | 0 | |
| | 1 | |
| BIT 5 | 0 | |
| | 1 | |
| BIT 6 | 0 | |
| | 1 | |
| BIT 7 | 0 | PARITY BIT |
| | 1 | PARITY BIT |

FIG. 14D

⟨ STATUS 2 ⟩

| BIT POSITION | | STATUS |
|---|---|---|
| BIT 0 | 0 | NO JAM |
| | 1 | JAM PRESENCE |
| BIT 1 | 0 | TRANSFER SHEET PRESENCE |
| | 1 | NO TRANSFER SHEET |
| BIT 2 | 0 | |
| | 1 | |
| BIT 3 | 0 | |
| | 1 | |
| BIT 4 | 0 | |
| | 1 | |
| BIT 5 | 0 | |
| | 1 | |
| BIT 6 | 0 | |
| | 1 | |
| BIT 7 | 0 | PARITY BIT |
| | 1 | PARITY BIT |

< STATUS 3 REQUIREMENT >

BINARY ENCODING REFERENCE
VOLTAGE INFORMATION
(INDICATION VALUE OF
OPERATION UNIT VOLUME 41)

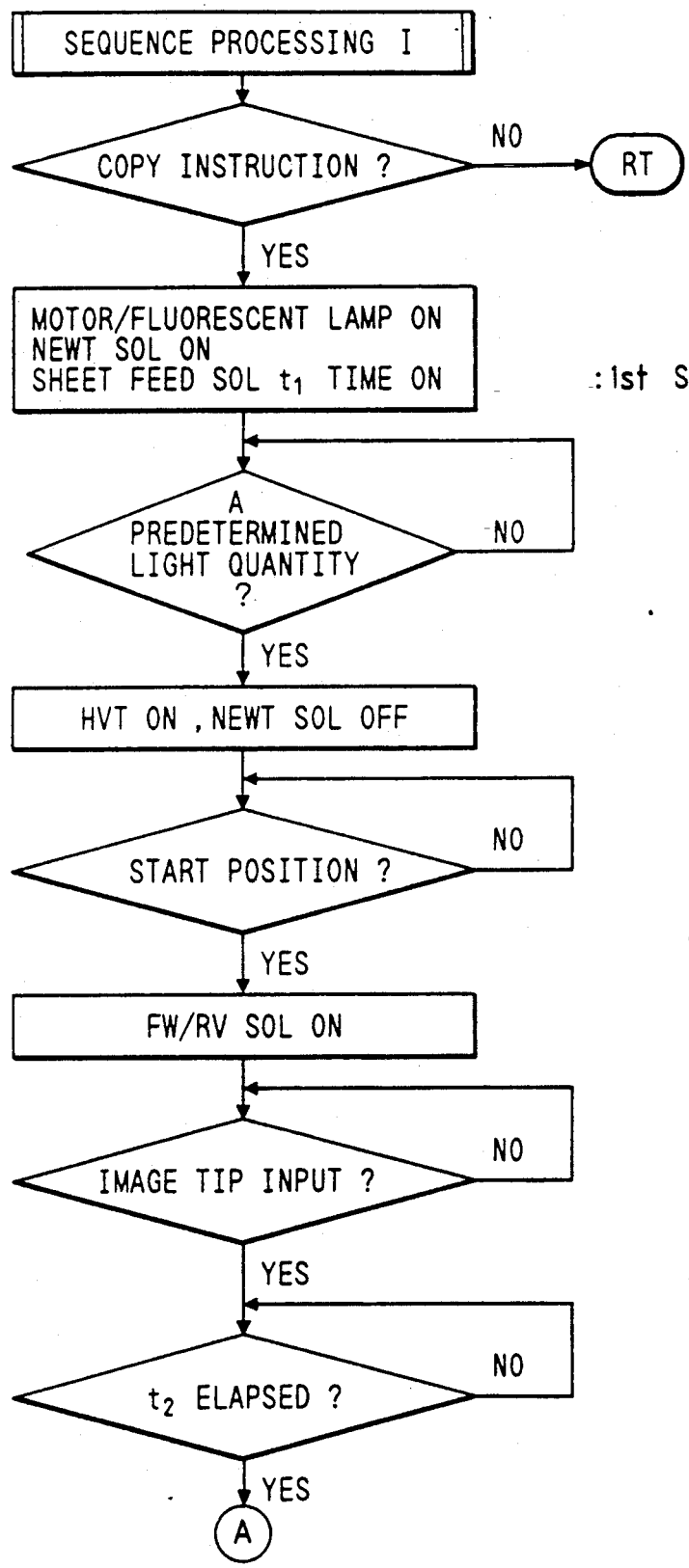

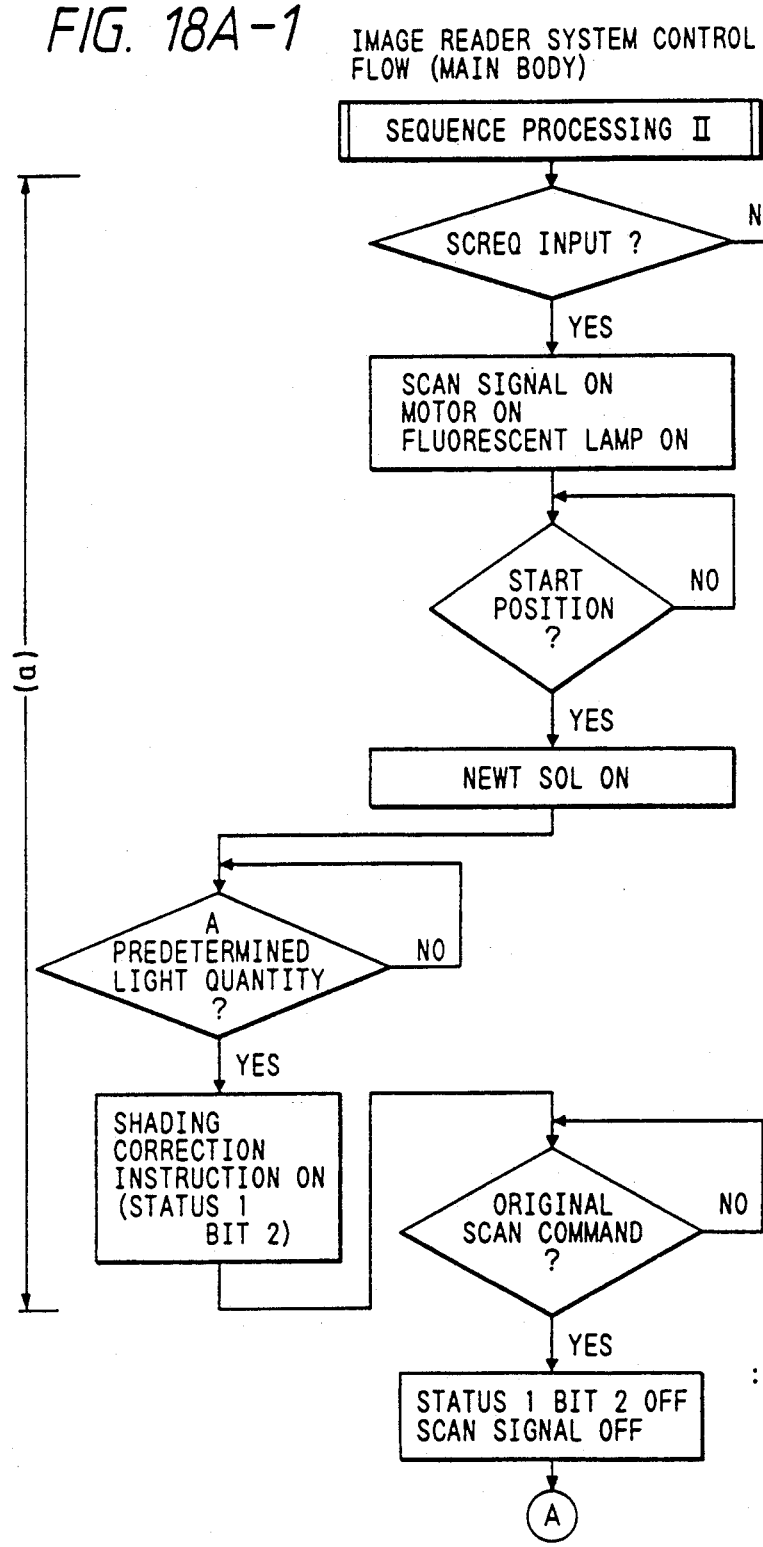

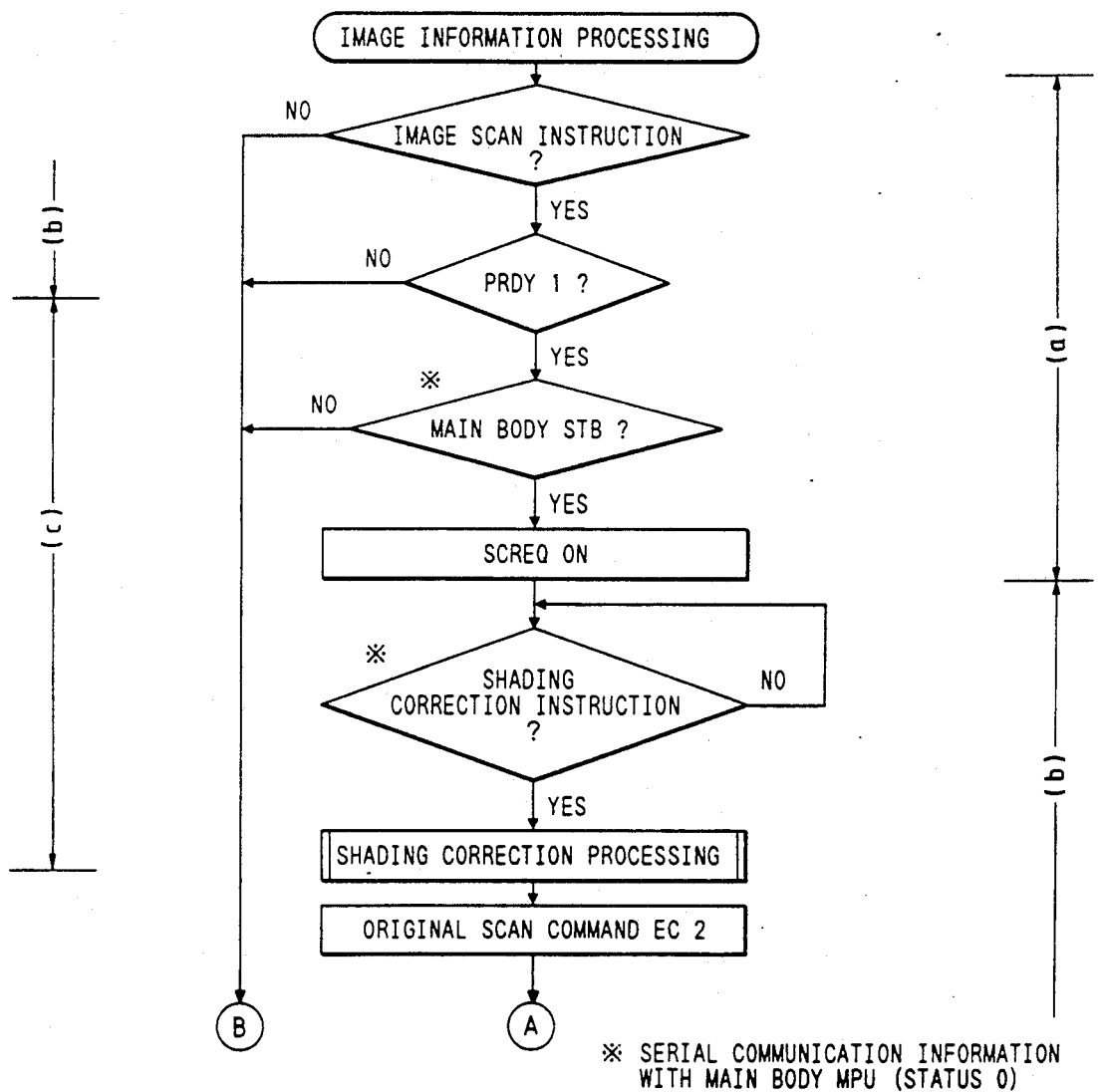

PRINTER SYSTEM FLOW (MAIN BODY)

| FIG. 20A |
| FIG. 20B |

CARTRIDGE III FLOW

※ SERIAL COMMUNICATION INFORMATION WITH MAIN BODY MPU (STATUS 0)

IMAGE RECORDING APPARATUS HAVING AN INTERCHANGEABLE CARTRIDGE

This application is a continuation of application Ser. No. 07/404,851 filed Sep. 8, 1989, now abandoned.

BACKGROUND OF THE INVENTION

1. Field of the Invention

The present invention relates to an image recording apparatus capable of achieving multiple functions by selectively mounting plural cartridges.

Conventional apparatus for processing image information is usually composed of separate units of different functions such as a copying unit for image copying, an image reading unit for converting an image into digital signals, an image recording unit for forming a digital image according to image information signals etc. so that it has been necessary to prepare various image recording units according to the desired forms of image recording.

For example, there is already commercialized an image recording apparatus capable of storage, transmission and copying of an image by converting the same into image signals, through the combination for example of an image reading unit, an image recording unit and a memory unit.

Though such apparatus facilitates the storage, transmission or other processings of an image by conversion thereof into image signals, the tendency is to obtain a coarse image due to the limitation in the resolving power of the image reading unit and of the image recording unit. For example, in case of copying image information, the quality of the copied image is considerably deteriorated and may become practically unacceptable.

However, an improved resolving power for avoiding the above-mentioned drawback inevitably leads to an increase in the dimension and cost of the apparatus, whereby the practical cost performance required in other functions such as storage or transmission are not met, and advantages of various image recording methods cannot be fully exploited.

SUMMARY OF THE INVENTION

In consideration of the foregoing, an object of the present invention is to provide an improved image recording apparatus.

Another object of the present invention is to provide an image recording apparatus capable of achieving various functions without increase in dimension and cost.

Still another object of the present invention is to provide an image recording apparatus capable of achieving various processings by commonly utilizing a part of the apparatus while interchanging plural cartridges.

Still another object of the present invention is to provide an image recording apparatus capable of achieving various processings by interchanging plural cartridges thereby varying the function state of a part of the apparatus.

Still another object of the present invention is to provide an image recording apparatus capable of image recording by interchanging plural cartridges respectively enabling different image recording processes.

Still another object of the present invention is to provide an image recording apparatus capable of image recording and image reading, by interchanging an image recording cartridge and an image reading cartridge.

The foregoing and still other objects of the present invention, and the advantages thereof, will become fully apparent from the following description which is to be taken in conjunction with the attached drawings.

BRIEF DESCRIPTION OF THE DRAWINGS

FIG. 13A is a timing chart showing interface signals and operation sequence of the printer cartridge;

FIGS. 14A, 14B, 14C, 14D and 14E are views showing information transferred between the main body and the cartridges;

DETAILED DESCRIPTION OF THE PREFERRED EMBODIMENTS

Figure 1:
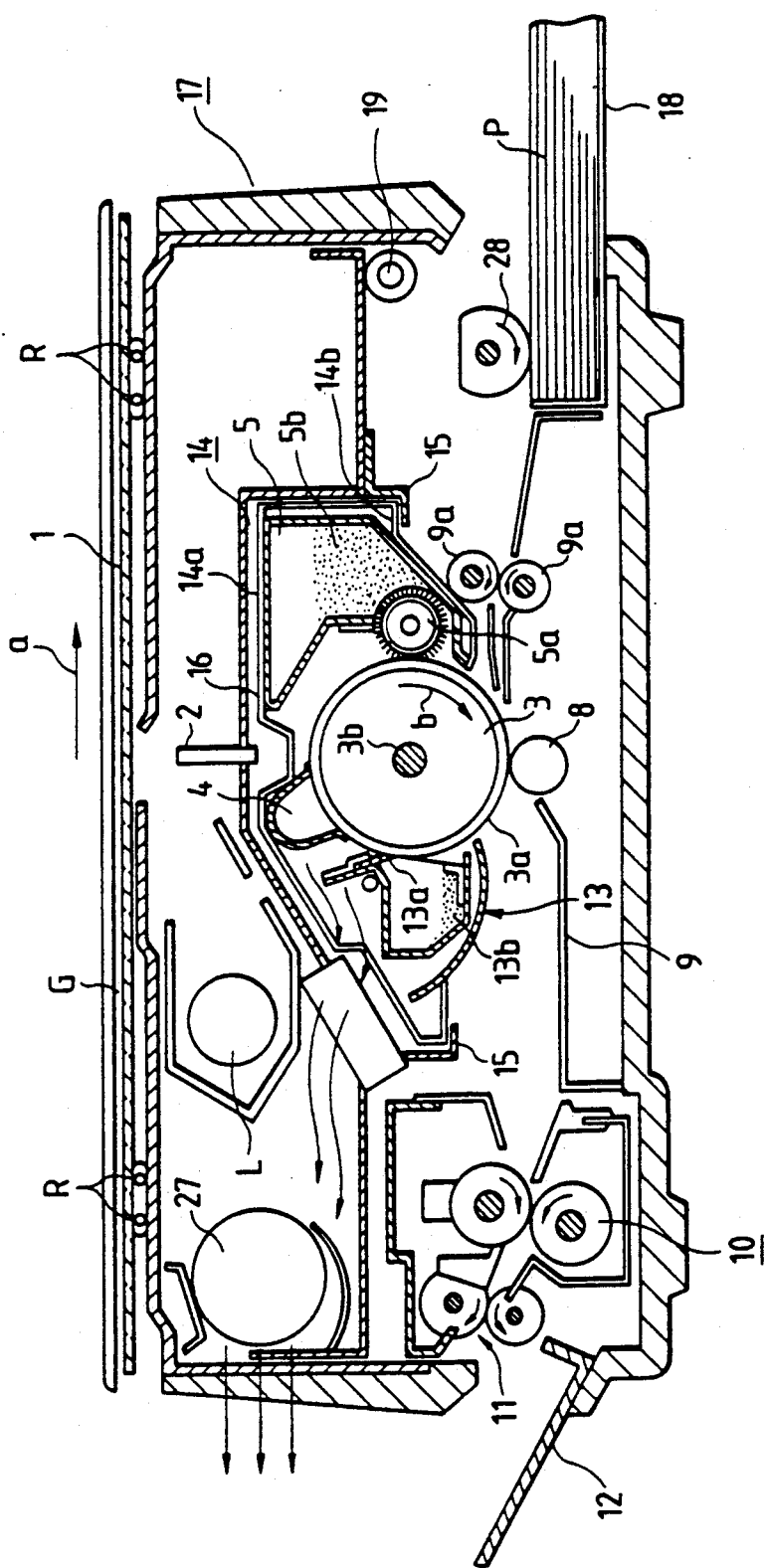
FIG. 1 is a cross-sectional view of an apparatus of the present invention loaded with a first image recording cartridge for an analog electrophotographic process.

Now the present invention will be clarified in detail by embodiments thereof shown in the attached drawings. First, there will be explained briefly the structure of an embodiment of the image forming apparatus, with reference to FIG. 1. An original support table 1, composed of a transparent member such as a glass plate, reciprocates on rails R in a direction a thereby scanning an original document. The image of the original document G placed on the original support table 1 is illuminated by a lamp L, and the reflected light is focused in a slit shape on a photosensitive drum 3, by means of an array 2 of short-focus small-diameter imaging elements. Said photosensitive drum 3 is rotated in a direction b about a shaft 3b. A charger 4 uniformly charges a photosensitive layer 3a, composed for example of zinc oxide or an organic semiconductor, formed on the photosensitive drum 3. Said drum 3 uniformly charged with the charger 4 is subjected to image-wise exposure by said array 2 to form an electrostatic latent image. Said latent image is rendered visible in a developing unit 5 composed of a magnet roller 5a and a toner reservoir 5b. A sheet P contained in a cassette 18 is advanced by means of a feeding roller 28 and registration rollers 9a driven in synchronization with the image formed on the photosensitive drum 3, and is fed onto said photosensitive drum 3, whereby the toner image formed on said drum 3 is transferred onto the sheet P by means of a transfer roller 8. The sheet P subsequently separated from the drum 3 by already known separating means is guided to a fixing unit 10 through a guide member 9 for fixing the toner image on the sheet P, and is discharged onto a tray 12 by means of discharge rollers 11. The toner remaining on the drum 3 after the toner image transfer is removed by a cleaner 13, composed of a blade 13a and a toner reservoir 13b. A slit aperture 16 is provided for guiding the image of the original to the photosensitive drum 3.

The toner image is composed of heat-fixable toner, composed for example of resin, and is fixed by heated fixing rollers 10 while the sheet is transported. The sheet is thereafter discharged by the discharge rollers 11. When an image recording cartridge based on the analog electrophotographic process, shown in FIG. 1, is mounted, there can be obtained a highly fine copy image as already known in the art. The cartridge 1 based on the analog electrophotographic process is composed of a photosensitive drum 3, a charger 4, a developing unit 5, a cleaner 13 and a cover 14 integrally combining the above-mentioned elements.

Figure 2:
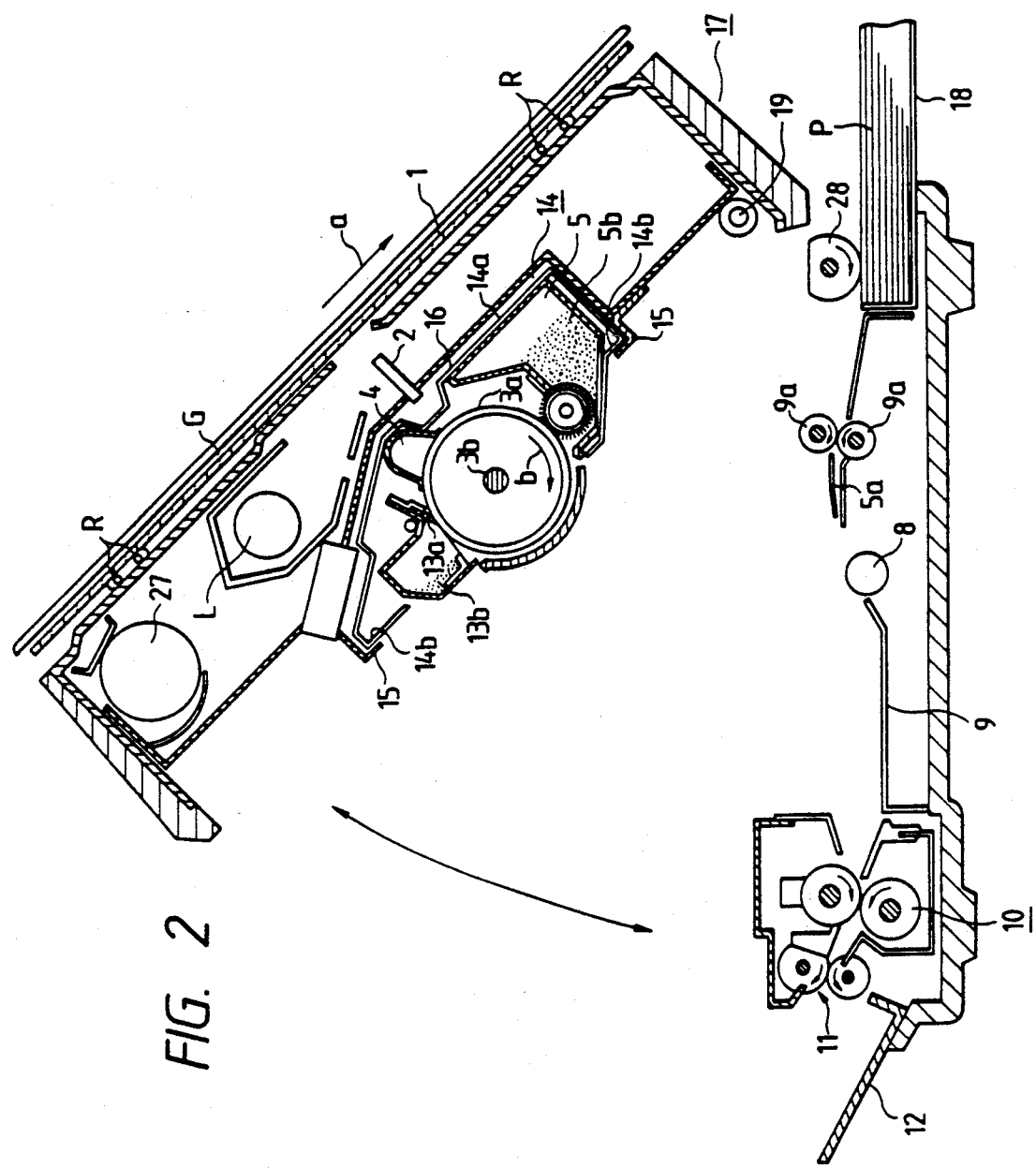
FIG. 2 is a cross-sectional view of said apparatus when an upper part thereof is opened for removing the cartridge shown in FIG. 1.

FIG. 2 shows a state in which an upper part 17 of the main body is lifted about a shaft 19 to enable replacement of the image recording cartridge. In the illustrated state the cartridge can be pulled out frontward perpendicularly to the plane of drawing, and another cartridge can be loaded by an inverse operation. The replacement of the cartridge is facilitated by the mutual sliding of a guide 14b of the cover 14 of the cartridge with a guide rail 14 provided on the upper part 17 of the main body. Other image recording cartridges also have a shaft corresponding to the drum shaft 3b, for defining the position of the cartridge with respect to the main body.

Figure 3:
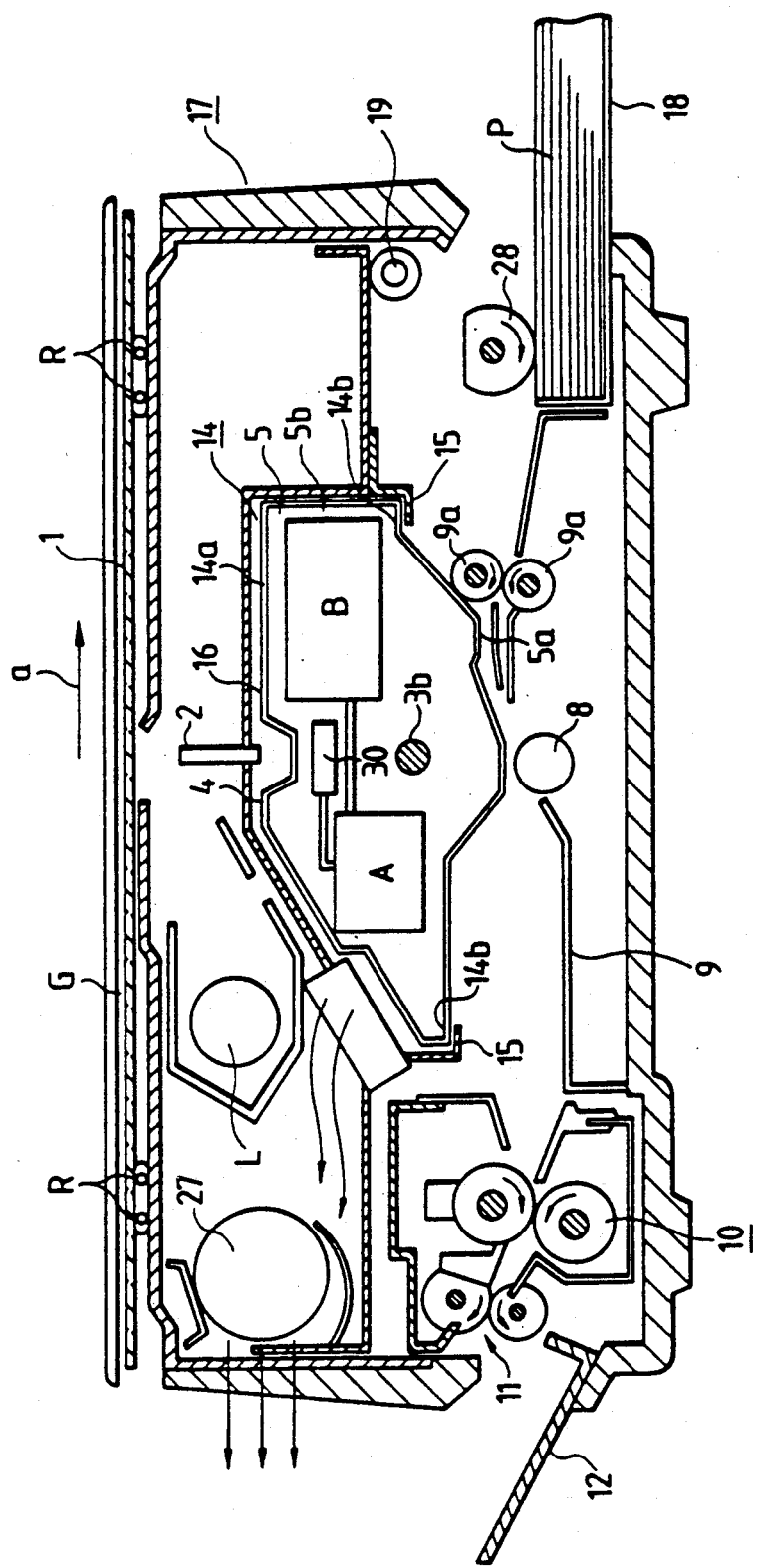
FIG. 3 is a cross-sectional view of said apparatus when an image reader cartridge is mounted.

FIG. 3 shows a state in which the image recording is conducted with a process different from the analog electrophotographic process by exchanging the image recording cartridge. In the present embodiment, an image reading line sensor array 30 is provided at a position corresponding to the image exposure position of the photosensitive drum 3 in the cartridge I, and the image of the original document is formed on said sensor array 30 by means of the array 2 and the light source L of the main body. The image reader cartridge II is provided with a cover 14 of a substantially same form of that of the above-explained cartridge I, and is placed at a proper position by the shaft 3b. The cartridge II of the present embodiment is provided with an I/O interface for transmission of image information to external equipment, and with electrical connections for exchanging timing control information for image reading with the controller of the main body of the image recording apparatus.

In the following explained is the function of the image recording apparatus shown in FIG. 3. When the image reader cartridge II is mounted, the image recording apparatus of the present embodiment performs as an image reader capable of reading, transferring or storing the image of the original document. Since the image reader functions as a terminal device for a personal computer or the like, the commands for the operations are supplied from an external host equipment. Also the internal memory means is not limited to semiconductor memories, but can be composed of other memories such as a magnetic disk, a magnetic tape, an IC card or a laser card, and such memory may be provided outside if it cannot be accommodated in the cartridge. When an image reading instruction is given from the host equipment, the original support table 1 with the original document thereon is reciprocated in the direction a on the rails R for scanning said original as in the case shown in FIG. 1. The original image is illuminated by the lamp L, and the reflected light is focused, by the imaging element array 2, onto the sensor array 30. The image information focused on the sensor array 30 is transferred to an image information processing unit B, in succession through an interface board A and in synchronization with encoder pulses of the driving motor (not shown) of the original support table 1. The image processing unit B binary digitizes thus received analog image information, and, if necessary, stores temporarily said image information in the above-mentioned memory. The information thus obtained is finally transmitted to the host equipment according to the specification of the interface thereof.

The details of electrical control of the above-mentioned image reader will be explained later.

Figure 4:
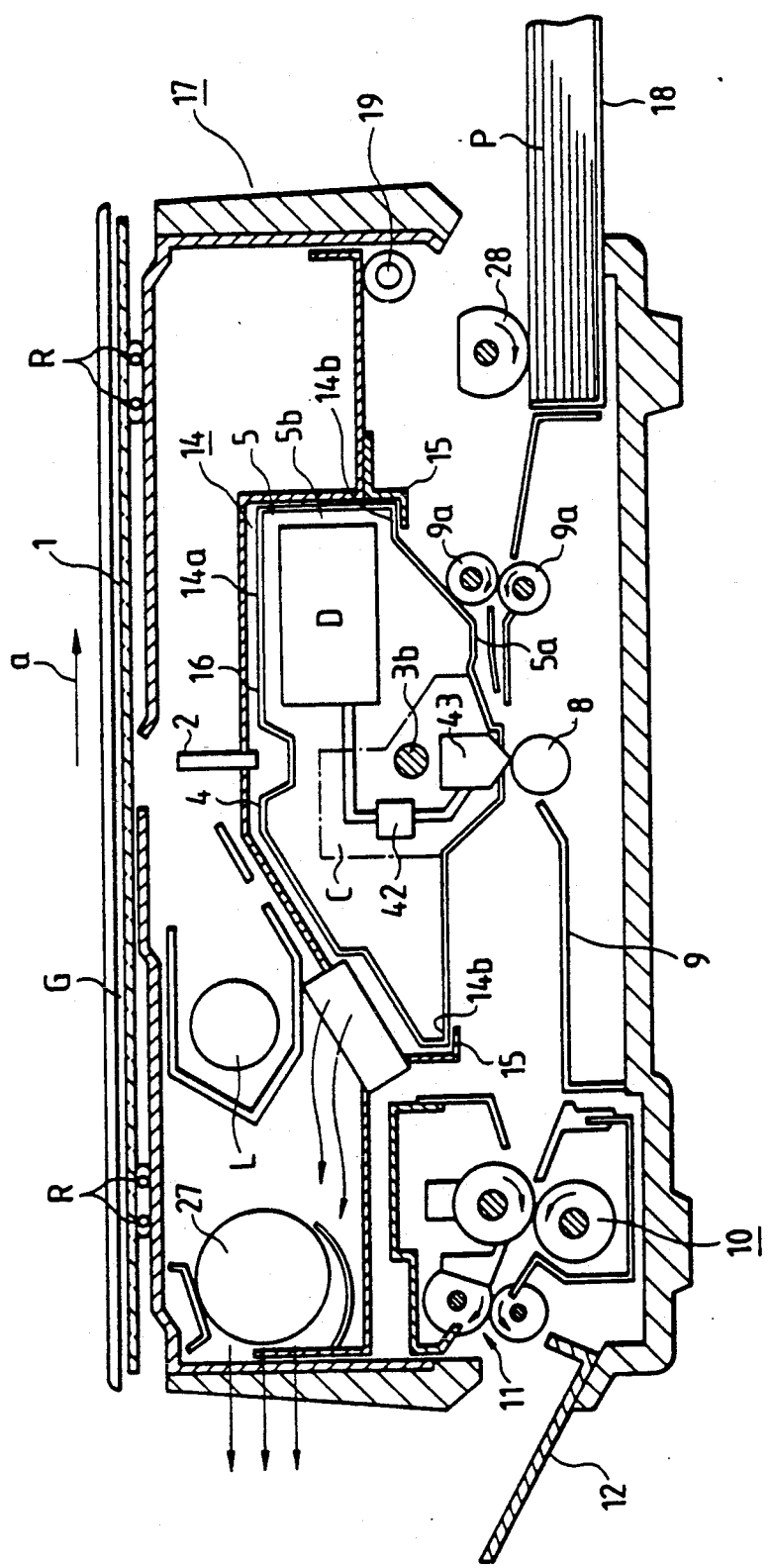
FIG. 4 is a cross-sectional view of said apparatus when a thermal printer cartridge is mounted.

FIG. 4 shows a state in which a cartridge III containing a thermal head 43 is mounted. In this state the apparatus functions as a thermal printer for printing the information, received from an external host equipment such as a personal computer, on thermal recording sheet housed in the cassette 18. In this case, the transfer roller 8 functions as transporting means for the recording sheet and also pressing said sheet against the thermal head 43. The pressure of said transfer roller is usually determined in consideration of the quality of the transferred image, such as uniformity of image or percentage of transfer. On the other hand, in case of thermal head, the pressure is determined in consideration of the efficiency of heat transmission to the recording sheet. If the optimum pressure is different for different image recording processes, there may be provided pressure regulating means for varying the pressure for different cartridges.

Figure 5:
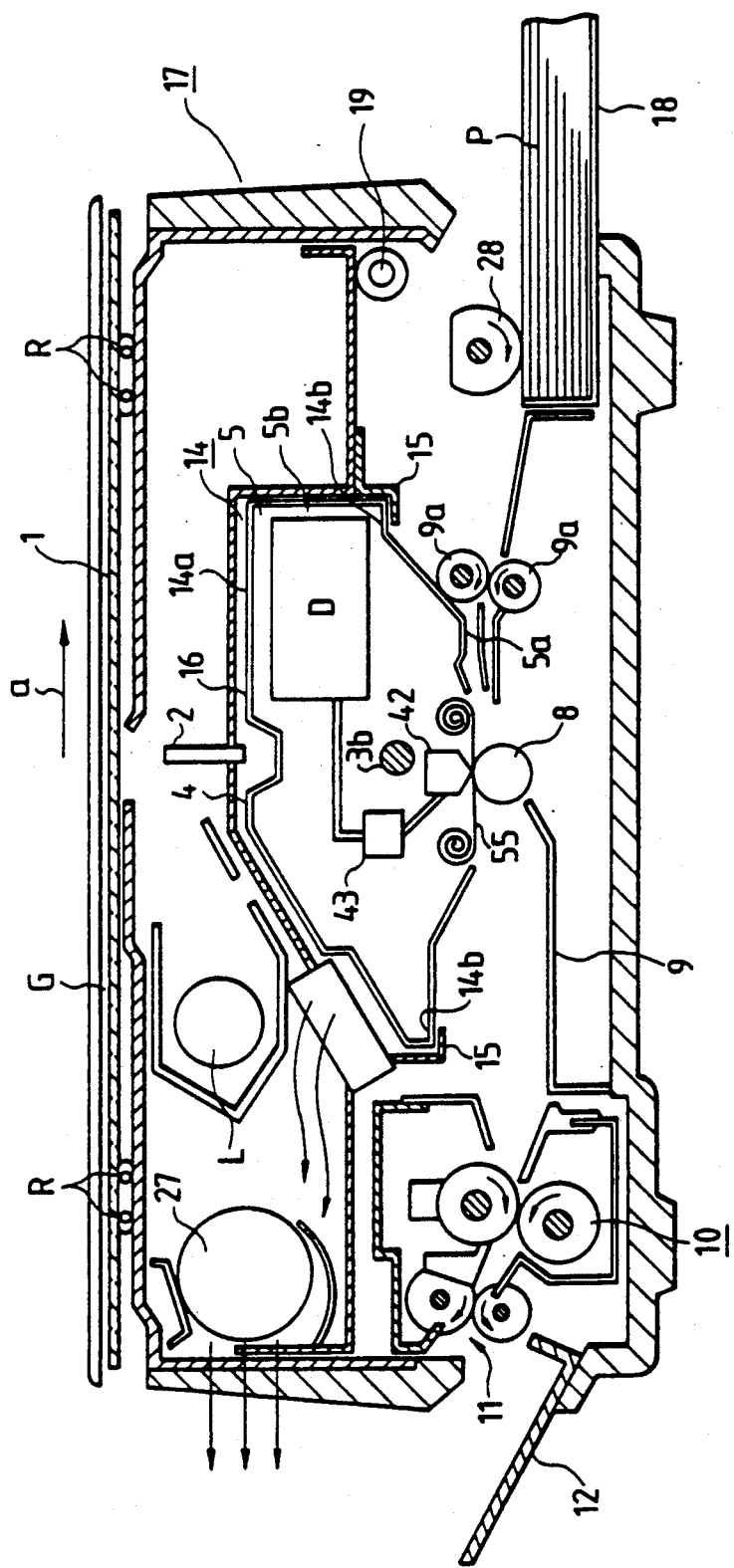
FIG. 5 is a cross-sectional view of said apparatus when another thermal printer cartridge, different from that shown in FIG. 4, is mounted.

FIG. 5 shows another embodiment of the thermal printer, functioning as a thermal transfer printer, in which a thermal transfer sheet 55 is provided in the cartridge III. In this case the recording sheet in the cartridge 18 can be ordinary paper, as in the case of analog electrophotographic cartridge I.

The details of electrical control for such thermal printers will be explained later.

Figure 6:
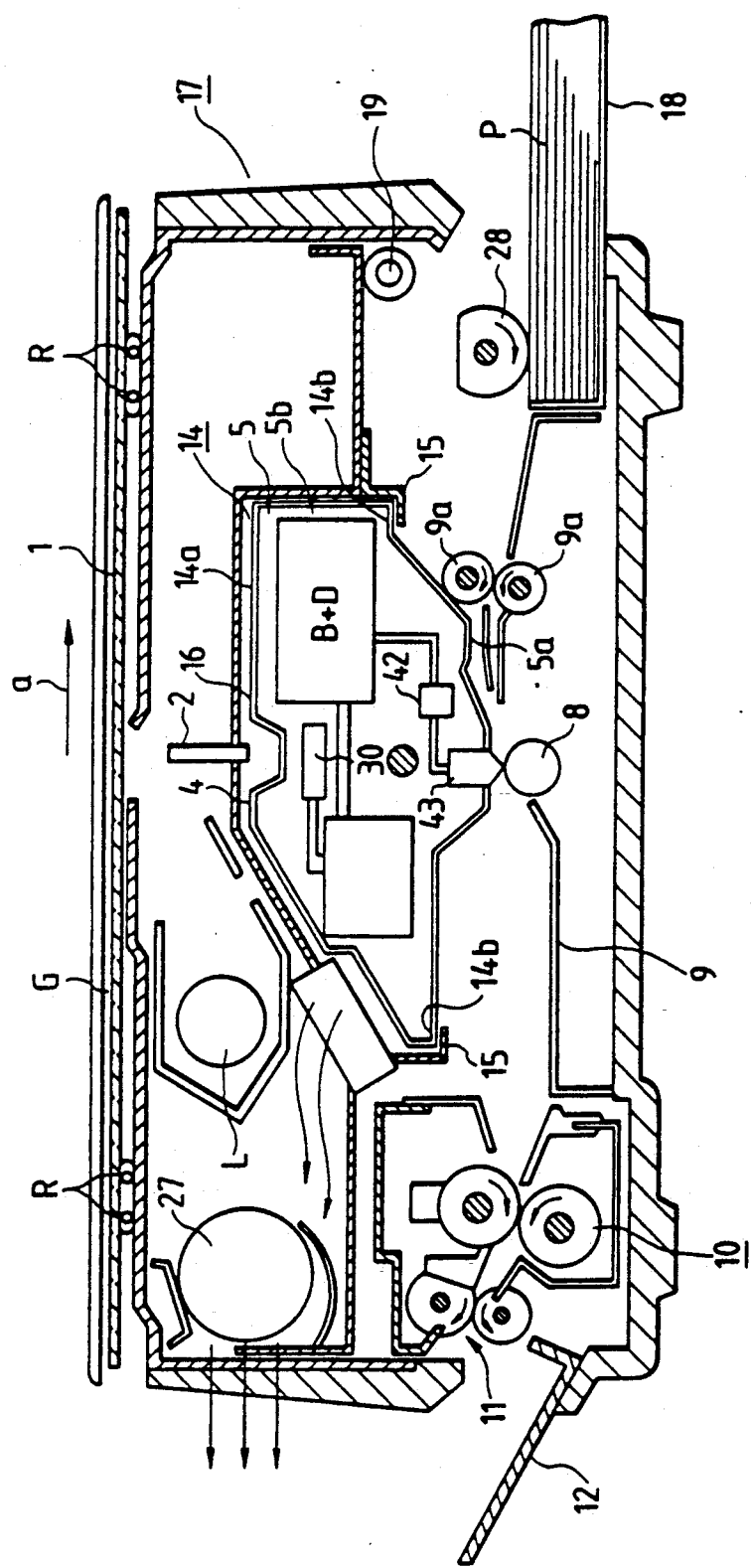
FIG. 6 is a cross-sectional view of said apparatus when a cartridge, functioning as an image reader and a thermal printer, is mounted.

FIG. 6 shows a state loaded with a cartridge IV having the functions of image reader shown in FIG. 3 and thermal printer shown in FIG. 4. In this case the apparatus can also function as a digital copying machine in which the analog image information read with the image reading line sensor 30 is binary digitized, and the thermal head 43 is driven by thus digitized information to provide a digitally reproduced image.

OUTLINE OF ELECTRICAL CONTROL SYSTEM

As already explained above, the present invention is to respond to various requirements by the optional change of various cartridges. Based on this concept, there are provided the cartridge I for ordinary electrophotographic process, the cartridge II as an image reader, and the cartridge III containing a thermal head for functioning as a thermal printer or a thermal transfer printer. Such optional structure enables functions not achievable with the conventional analog copying machine, such as the image input to an external equipment such as a personal computer and the recording of information supplied from an external equipment, through the common use of the main body and mere exchange of the cartridges.

Consequently, in comparison with the conventional stand-alone copying machine, there are required an interface for communication between the main body and the cartridges, and another interface for communication between the cartridge and the communication line or the external equipment such as a personal computer.

In consideration of the foregoing, there will be explained, in the following, the block diagram of the electrical circuits of the main body, and the timing chart of the basic function as analog copying machine. Thereafter explained in succession are the block diagram of the entire system when the apparatus functions as an image reader by the loading of the image reader cartridge II, the timing chart of the interface signals between the main body and the optional cartridge, and the details of control based on the control flow chart of the controller of the optional cartridge. Subsequently similar explanations will be given on the printer cartridge III and the reader-printer cartridge IV.

STRUCTURE OF MAIN BODY

Figure 7:
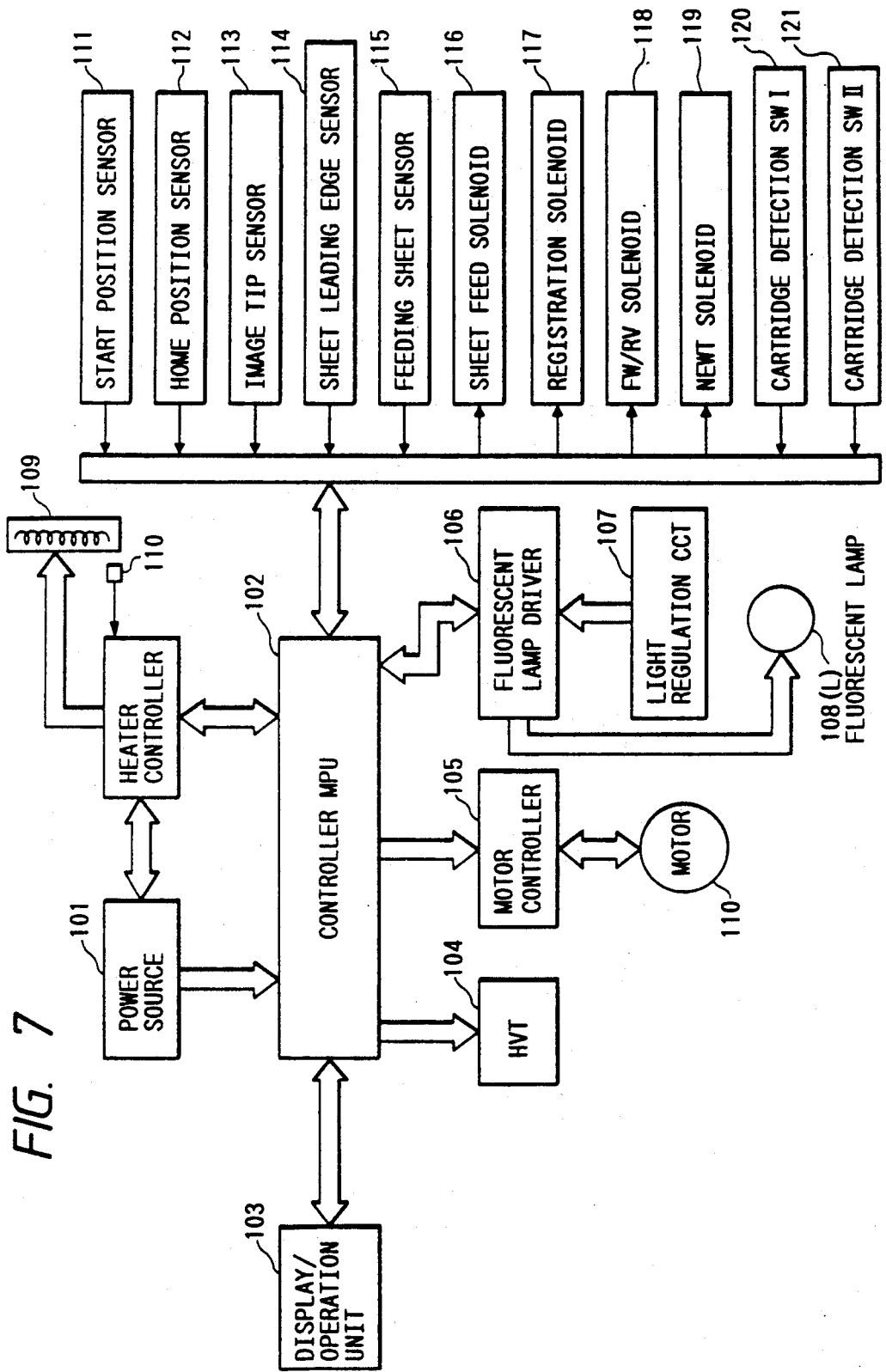
FIG. 7 is a block diagram of the electric circuits of said apparatus.

FIG. 7 is a block diagram of the main body, composed principally of a DC power source 101; a controller 102 for sequence control of the main body and for interface control with the optional cartridge; a display-operation unit 103; a high voltage unit 104 for forming the electrostatic latent image on the photosensitive drum; a motor controller 105 for maintaining DC motors at a predetermined speeds; a lamp driver 106 and a light regulating circuit 107 for lighting a fluorescent lamp with a predetermined intensity; DC loads (motor 110 and fluorescent lamp 106 corresponding to the lamp L in FIG. 1); solenoids 116–119; and sensors 111–115, 120, 121. Said sensors include two switches 120, 121 for identifying the cartridges, and said switches can identify four different cartridges by the on-off combinations. The functions of other DC loads and sensors will be explained in the following description.

Figure 8:
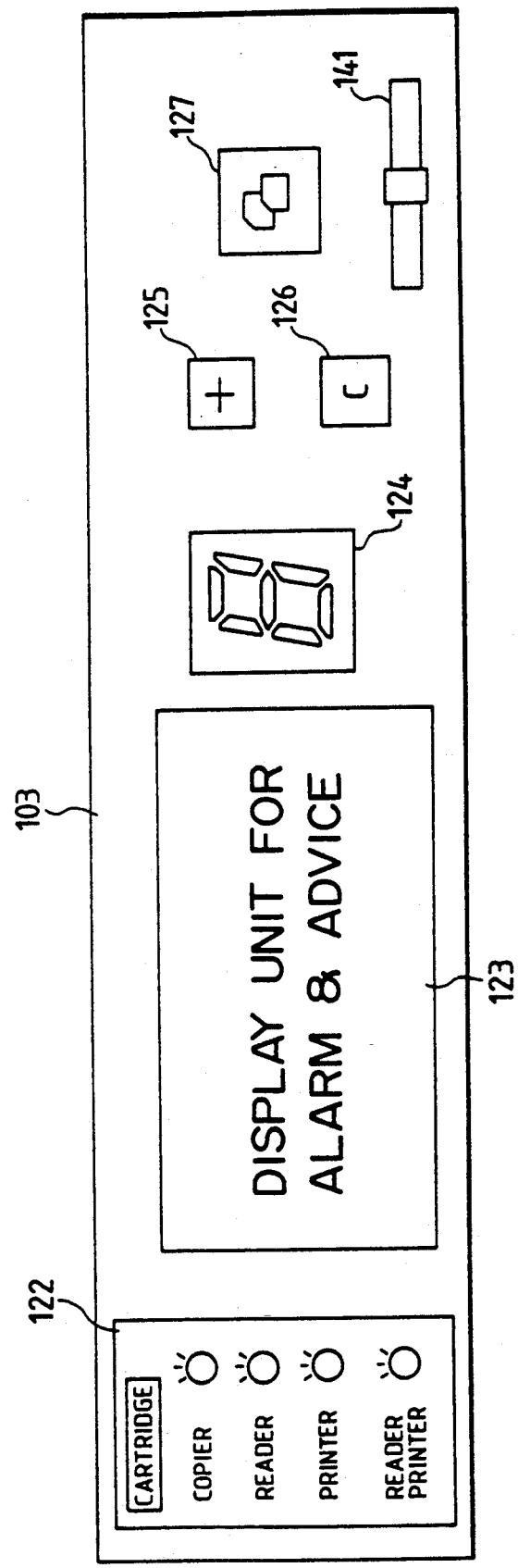
FIG. 8 is a plan view of a display-operation unit of said apparatus.

FIG. 8 shows the details of the display-operation unit 103 of an embodiment of the image recording apparatus. In a left-hand area 122 there are provided four lamps indicating the currently loaded cartridge. No lamp will be turned on if no cartridge is loaded. In such case a message such as "Load cartridge" may be displayed on an alarm-advice display unit 123.

Said alarm-advice display unit 123 is used for displaying messages indicating the result of diagnosis of the main body in various modes or the state of optional cartridges II–IV obtained through the interface. More specifically, it for example shows, for the electrophotographic cartridge I, (1) sheet jamming, (2) absence of recording sheet, (3) stand-by state of the fixing unit, (4) failure in sequence etc. For the image reader cartridge II, it for example shows (1) whether the power supply of the cartridge is turned on, (2) whether desired communication with the microprocessor of the cartridge has been conducted, (3) whether the cartridge is connected to the external equipment such as a personal computer or to a facsimile line through a modem etc.

Also for the printer cartridge III, there may be displayed the messages (1), (2) and (4) for the cartridge I and (1), (2) and (3) for the cartridge II. The messages for the cartridge IV are also similar.

There are also provided a display unit 124 for indicating the number of copies in the copying mode; a plus key 125 for setting the number of copies; a clear key 126 for clearing the number of copies set by the key 125; a copy start key 127 for the electrophotographic cartridge I; and a density regulating knob 141 for regulating the bias voltage applied to the developing unit 5 when the cartridge I is loaded.

OUTLINE OF SOFTWARE

Figure 15A:
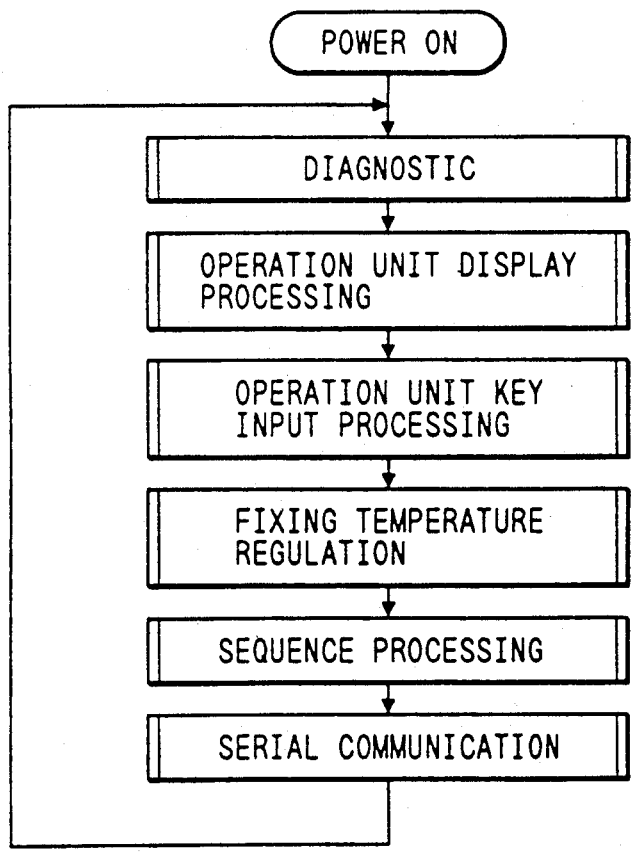
FIG. 15A is a flow chart showing the outline of control sequence of the main body.
Figure 16:
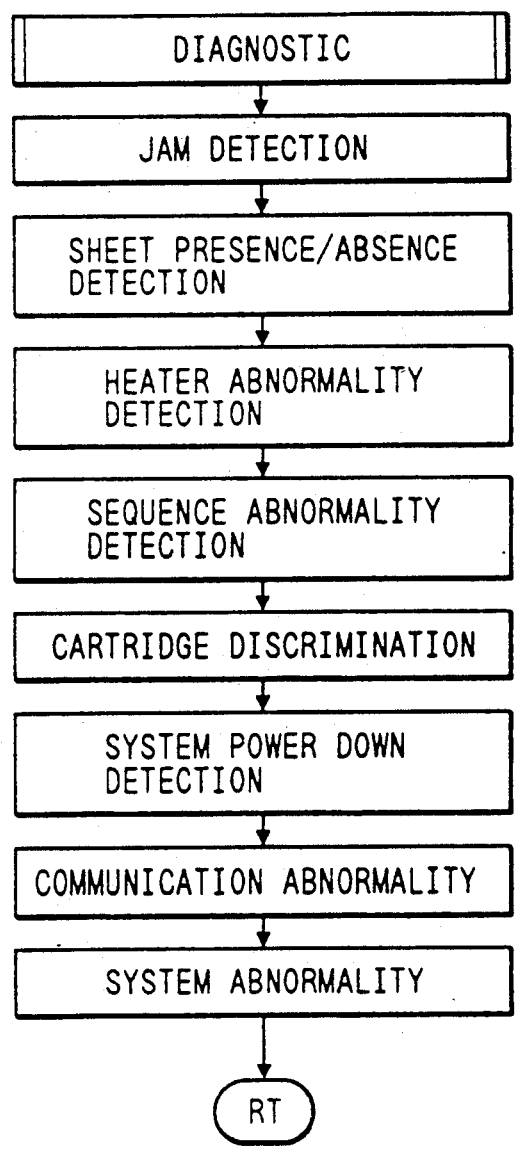
FIG. 16 is a flow chart showing the details of a diagnosis program.

The outline of the control program of the microprocessor of the controller of the main body is shown in FIG. 15A. Said program is principally composed of six blocks. A diagnosis program effects, as shown in FIG. 16, inspections for the sheet jamming, presence or absence of recording sheets, abnormality in the heater control system, abnormality in the sequence of the main body, identification of cartridges, and, for the optional cartridges, system power-down, abnormality in the communication with the microprocessor of the main body, and abnormality in the system.

Figure 11:
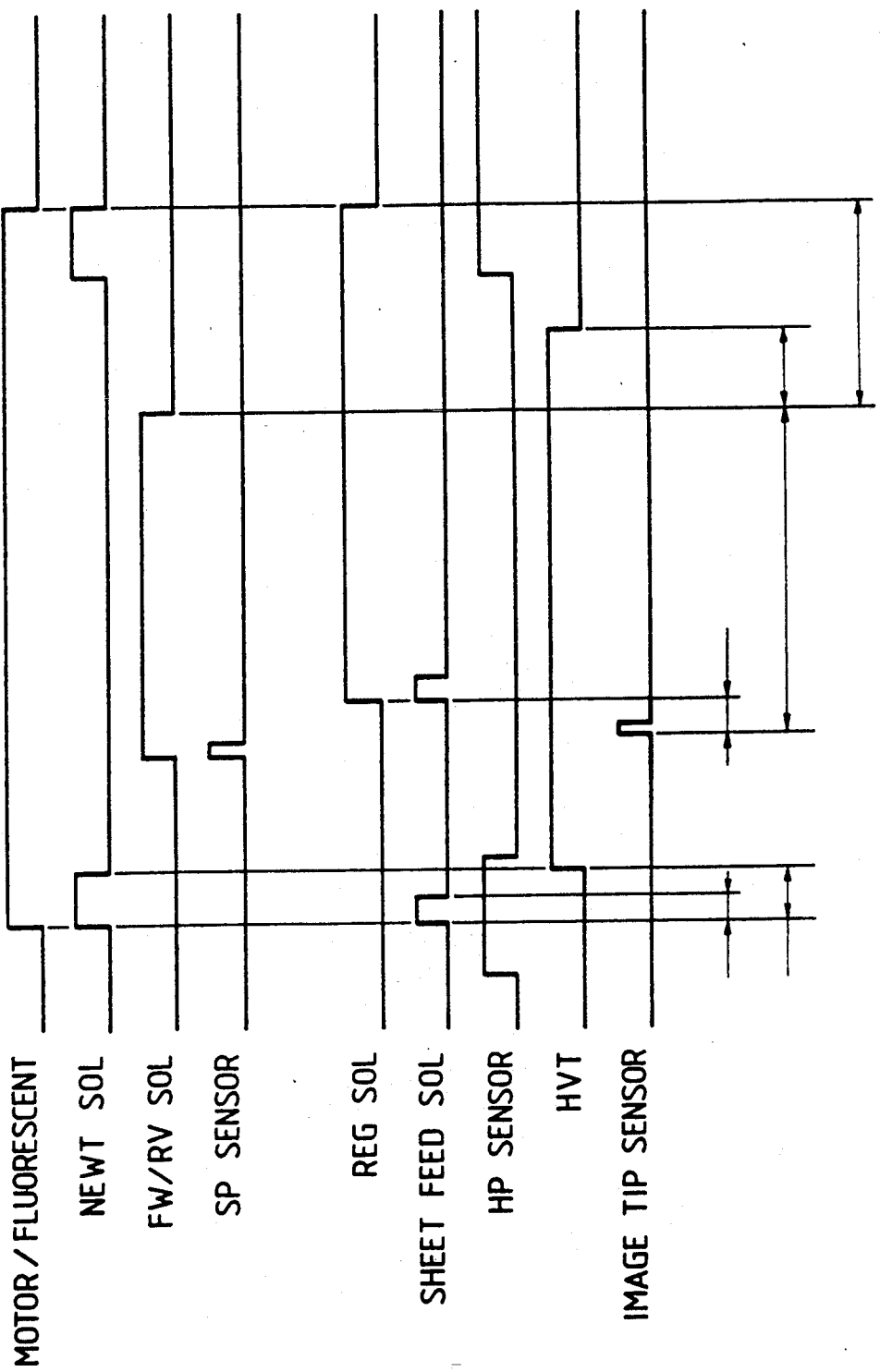
FIG. 11 is a timing chart showing the operation sequence of the analog copying machine.

An operation unit display program displays messages indicating the state of the system, based on the result of the diagnosis program, on the above-mentioned display unit 23 shown in FIG. 11.

Figure 15B:
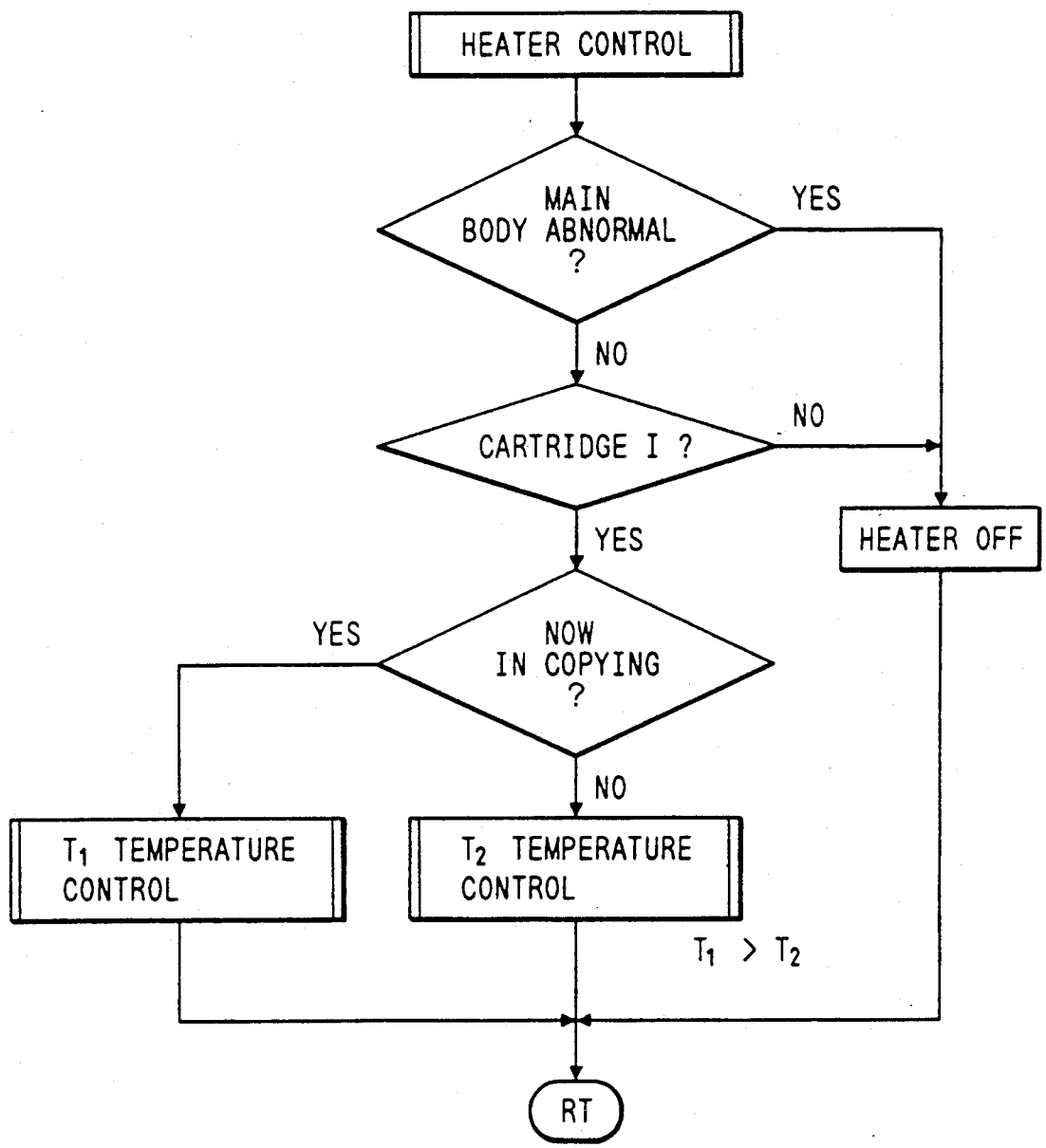
FIG. 15B is a flow chart showing the control sequence for heater.

An operation unit key input program is selectively effective for the electrophotographic cartridge I, and controls the copy number display unit 124 in response to the inputs from the plus key 125 and the clear key 126. A fixing temperature regulating program controls the power supply to a heater 109 in response to the inputs from a temperature sensor (thermistor) 110 so as to maintain a predetermined fixing temperature, only when the main body is in the normal state and in the electrophotographic cartridge mode. The power supply to the heater 109 is interrupted in the modes with the cartridges II-IV. The process flow of the above-mentioned heater control is shown in FIG. 15B.

Figure 12A:
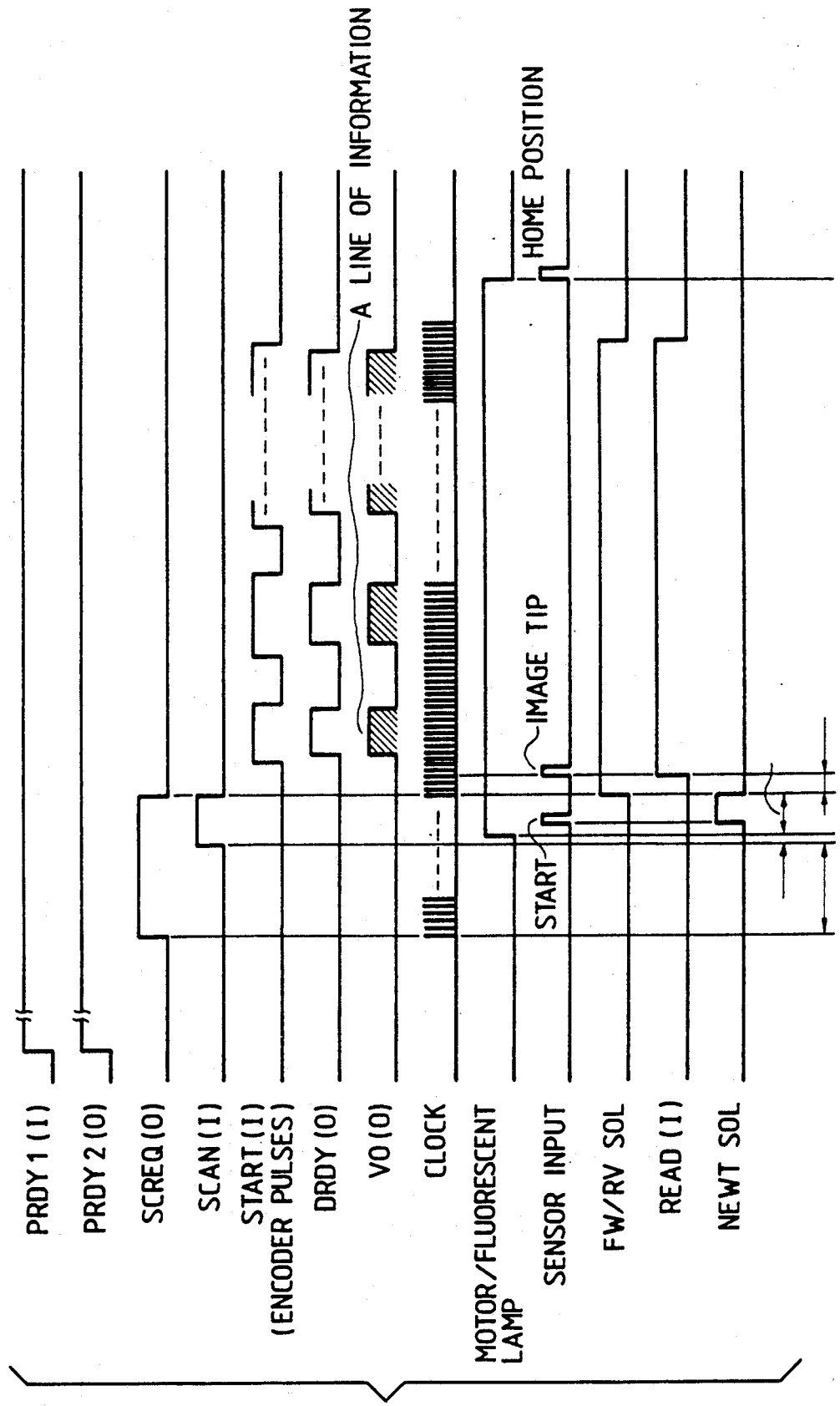
FIG. 12A is a timing chart showing interface signals and operation timing of the image reader.
Figure 12B:
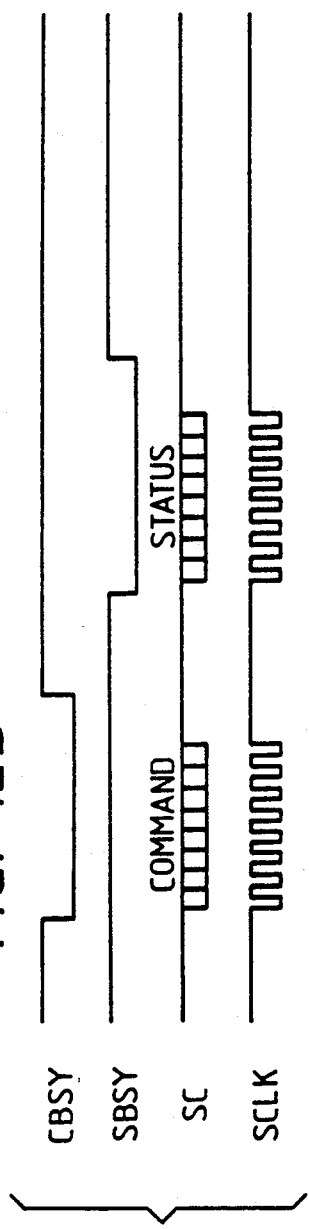
FIG. 12B is a timing chart showing the protocol of communication between the main body and the cartridge.

A sequence process program is provided for respective cartridge, based on the identification of cartridge shown in FIG. 16, as will be explained later. A serial communication program executes the communication with the MPU (microprocessor) of the cartridge only when either of the cartridges II-IV is loaded. Said communication is conducted by serial communication as shown in FIG. 12B. There are provided four signal lines for this purpose. A command busy signal CBSY is used for making access by the MPU of the optional cartridge to the MPU of the main body for asking the status thereof, and, in response to the entry of said signal, the MPU of the main body enters a stand-by state for serial transfer. Immediately after said signal, the MPU of the cartridge releases a command of 8 bits on a line SC, in synchronization with serial clock signals SCLK. The MPU of the main body analyzes said command, and releases the response to the enquiry in the form of 8-bit status data. Prior to said data, the MPU of the main body releases a status busy signal SBSY, thereby making access to the MPU of the cartridge. The serial clock signals SCLK are released from either MPU depending on the situation.

Figure 14E:
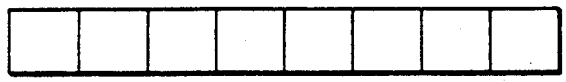

FIGS. 14A to 14D show the details of the command data and status data. FIG. 14A shows the listing of commands, which can be divided into SR commands for requesting the status from the MPU of the optional cartridge to the MPU of the main body, and EC commands for designating serial clock signal.

A command SR0 is used for requesting the status of the main body prior to the image scanning or print out. In the responding data STATUS0 (FIG. 14B), a bit 0 indicates the presence or absence of jammed sheet in the main body, a bit 1 indicates whether the recording sheet is set at the sheet feeding slot, and a bit 2 indicates whether the heater temperature is below the predetermined temperature. The cartridge discriminates whether the operation is possible, based on these data, and responds to the command from the external equipment for example a personal computer. If the bit 0 is "1", the cartridge identifies the presence of a jammed sheet in the apparatus and rejects the command from the external equipment also in the operations of image scanning and print out. If the bit 1 is "1", indicating the absence of recording sheet at the feeding slot, the command for printout operation is rejected when the cartridge III or IV is loaded. If the bit 2 is "1", indicating that the temperature of the fixing unit is not yet reduced to a predetermined temperature, the printout operation with the cartridge III or IV may cause a trouble for example if thermal recording sheet is employed for recording. Said bit is used for preventing such trouble. Bits 3 and 4 respectively indicate the abnormality in the heater control system and the motor control system. A bit 7 is a parity bit.

A command SR1 is used for requesting the information on abnormality during an image scanning operation with the cartridge II or IV. During said operation, the MPU of the cartridge constantly sends said command to the main body, thereby inspecting the status thereof. In response, the MPU of the main body releases status data STATUS1, in which a bit 0 becomes "1" in case of an abnormality in the movement of the original support table in the course of image scanning, and a bit 1 assumes "1" if the fluorescent lamp 108, used as the exposure light source, does not reach a predetermined light intensity after the lapse of a predetermined period. A bit 7 is used as the parity bit.

A command SR2 is released during the printout operation with the cartridge III or IV, and a responding code STATUS2 contains a bit 0 indicating the presence of sheet jamming, and a bit 1 indicating the absence of sheet at the feeding slot.

In response to the abnormality or alarm of the main body obtained from the status information during the operation, the MPU of the cartridge suitably interrupts the processing, thereby preparing for the re-start of the operation. In the foregoing there has been explained the communication, particularly the serial communication, between the main body and the cartridge. In the following there will be explained the control sequence of the main body and the information processing in respective cartridge, and the interfacing between the main body and the cartridge.

FUNCTION AND CONTROL FLOW (1) Electrophotographic cartridge I

Figure 17B:
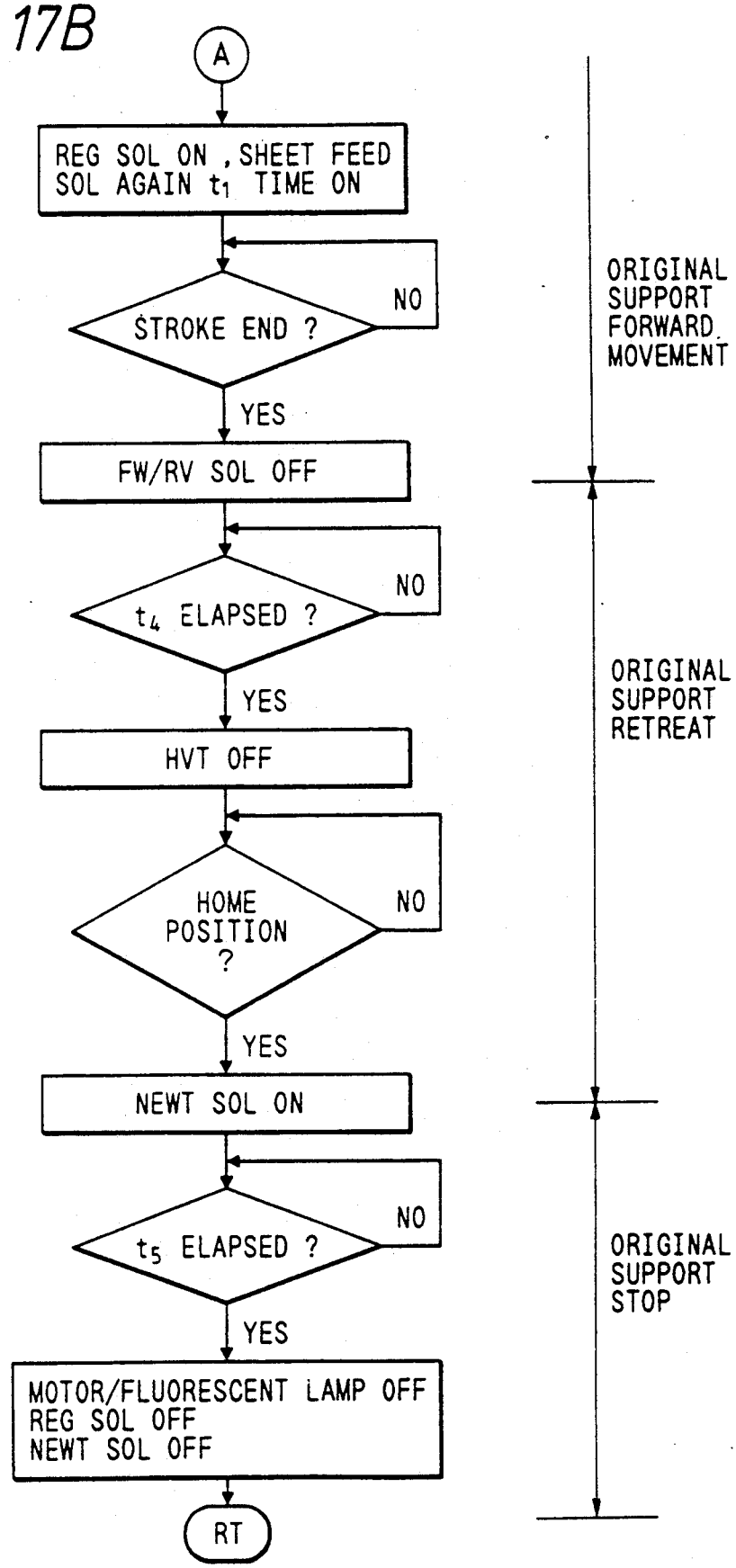
FIG. 17, consisting of FIGS. 17A and 17B, is a flow chart showing the control sequence of an analog copying mode.

As already explained before, FIG. 7 shows the block diagram of the apparatus when it is used in the stand-alone state. FIGS. 11 and 17 respectively are a timing chart and a flow chart of sequence control when the electrophotographic cartridge I is employed.

When the copy start key 127 shown in FIG. 8 is depressed, the motor 110 starts to rotate, and the fluorescent lamp 108 is also turned on. At the same time a neutral solenoid 119 for the original support table and a sheet feeding solenoid 116 for driving a semicircular roller are energized. The latter solenoid is energized for a predetermined period $t_0$ (about 100 ms), whereby the sheet is advanced into the apparatus by a half of the external periphery of the semicircular roller 128. Thus the leading end of the sheet reaches the registration rollers 129. If there is detected, in this state, that the light intensity of the fluorescent lamp has been brought to a first predetermined value by the light regulating circuit 107, the neutral solenoid 119 is deactivated whereby the original support table starts to move toward a start position with a first speed. Said first predetermined light intensity and said first speed are determined by process conditions such as the amount of exposure of the original and the sensitivity of the drum. When a start position sensor 111 is turned on, a forward-reverse solenoid 118 is energized whereby the original support table starts to move in the forward direction. After an image front end sensor 113 is turned on, a registration solenoid 117 and a sheet feeding solenoid 116 are energized with a predetermined delay $t_2$, whereby the aforementioned sheet stopped at the registration rollers 129 is transported again. The sheet feeding solenoid 166 is energized for a period $t_0$ (about 100 ms) as before, whereby the sheet is forcedly advanced by a half of the external periphery of the semicircular roller 128. However, since the registration rollers 129 are rotated now, the sheet is further advanced thereby and enters the nip between the photosensitive drum 3 and the transfer roller 8, thereby receiving the transfer of the toner image. The recording sheet after image transfer is further advanced and is subjected to thermal fixation by the fixing rollers 10.

On the other hand, the original support table is reversed by the deactivation of the forward/reverse solenoid 118 after the lapse of a predetermined period $t_3$ from the signal entry from the image front end sensor 113. Then the neutral solenoid 119 is energized when the home position sensor 112 is activated, whereby the original support table stops at the home position and awaits the complete discharge of the recording sheet from the apparatus. In the present embodiment there is predetermined a period $t_5$ from the reversing of the original support table to the stopping of the motor. Also the high-voltage unit 104, for forming the electrostatic latent image on the photosensitive drum 3, is turned on, as shown in FIG. 11, when the original support table starts to move toward the start position after the intensity of the fluorescent lamp reaches a predetermined value, and is turned off after the lapse of a predetermined time $t_4$ from the reversing of the original support table.

When the electrophotographic cartridge I is loaded, the sequence control is conducted as explained above (FIG. 11).

(2) Image reader cartridge II

Figures 2, 9A:
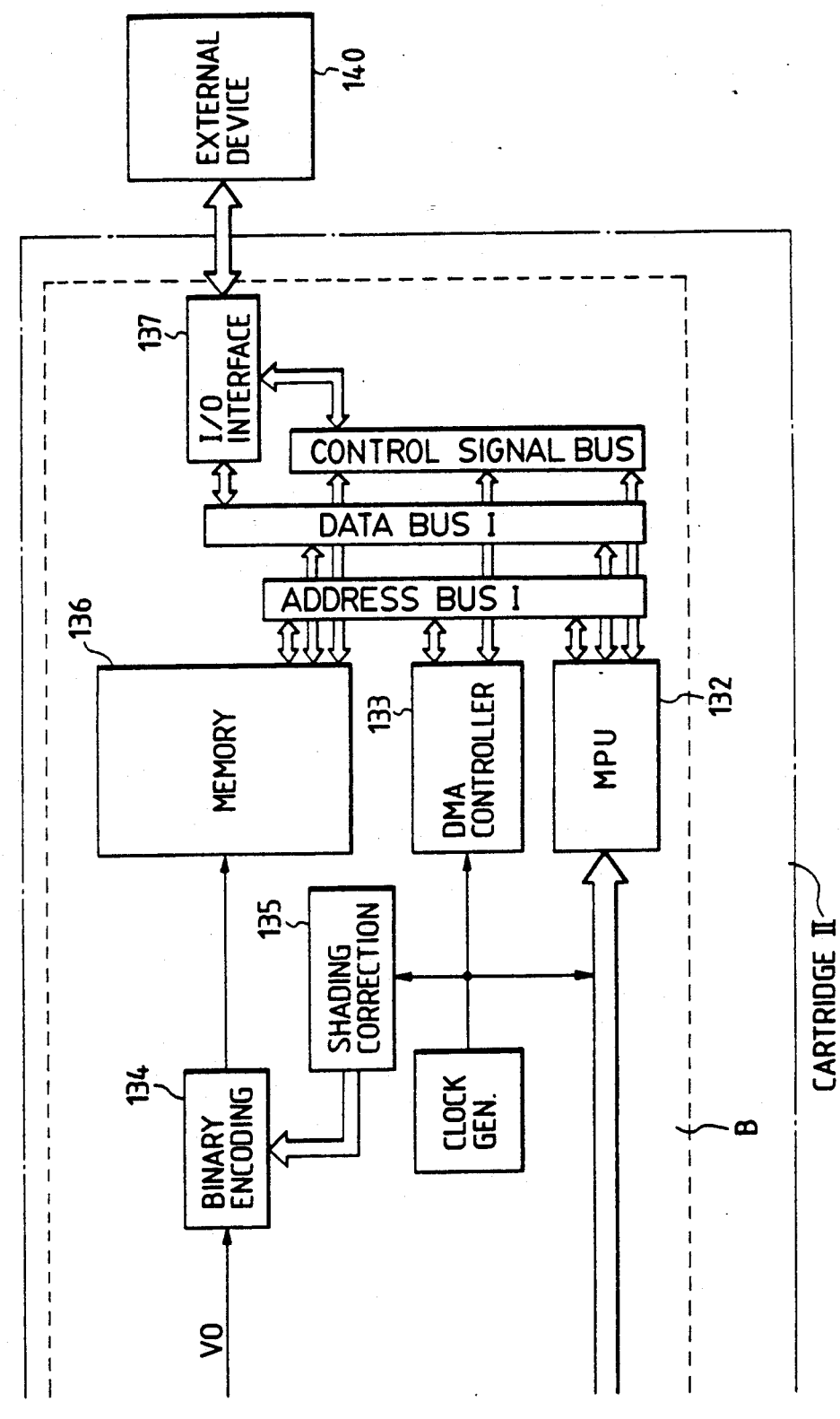
FIG. 9A, consisting of FIGS. 9A-1 and 9A-2, is a block diagram of the image reader cartridge.

FIG. 9A is a block diagram when the cartridge II is loaded. In this case the image of the original is read with the image sensor, and the obtained information is transmitted to an external equipment such as a personal computer for example for editing therein. Consequently, different from the case of the cartridge I, there is not required control relating to the transportation of the recording sheet in the main body.

Figure 12C:
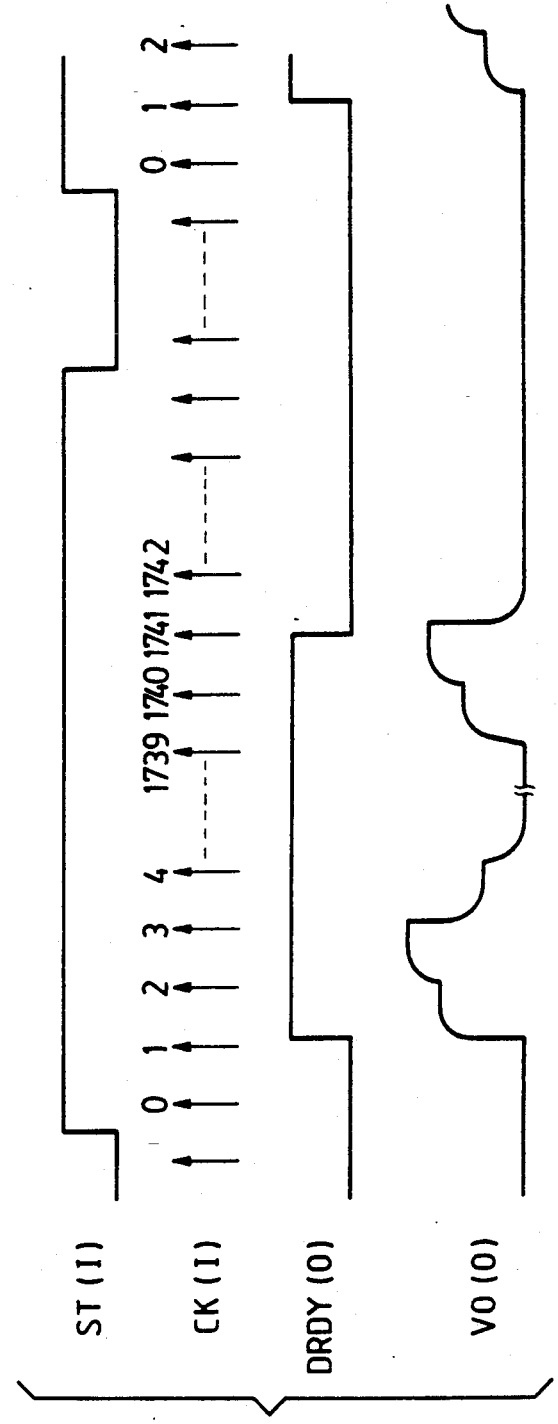
FIG. 12C is a timing chart showing the operation sequence of the image sensor.

At first there will be explained the structure of the cartridge II, with reference to FIG. 9A. The cartridge II is composed of a block A containing an image sensor unit 130, and a block B for control for binary digitization of the analog information from the image sensor unit 130 and storage of the digitized information in a memory, and for interface control for the transmission of thus stored information to the external equipment. As shown in FIG. 12C, in response to the entry of a start signal ST from the outside, the image sensor unit 130 releases image information $V_0$ of a line in the form of analog serial information, in synchronization with clock signals from a clock generator. For example, in case of a sensor of 8 pels, there is obtained, from the original of A4 size, information of 8 pel$\times$216 mm=1728 pixels. In practice there are provided certain margins as shown in FIG. 12C. The information $V_0$ read in a line is ensured while a data ready signal DR is at the H-level.

Figures 2, 18A:
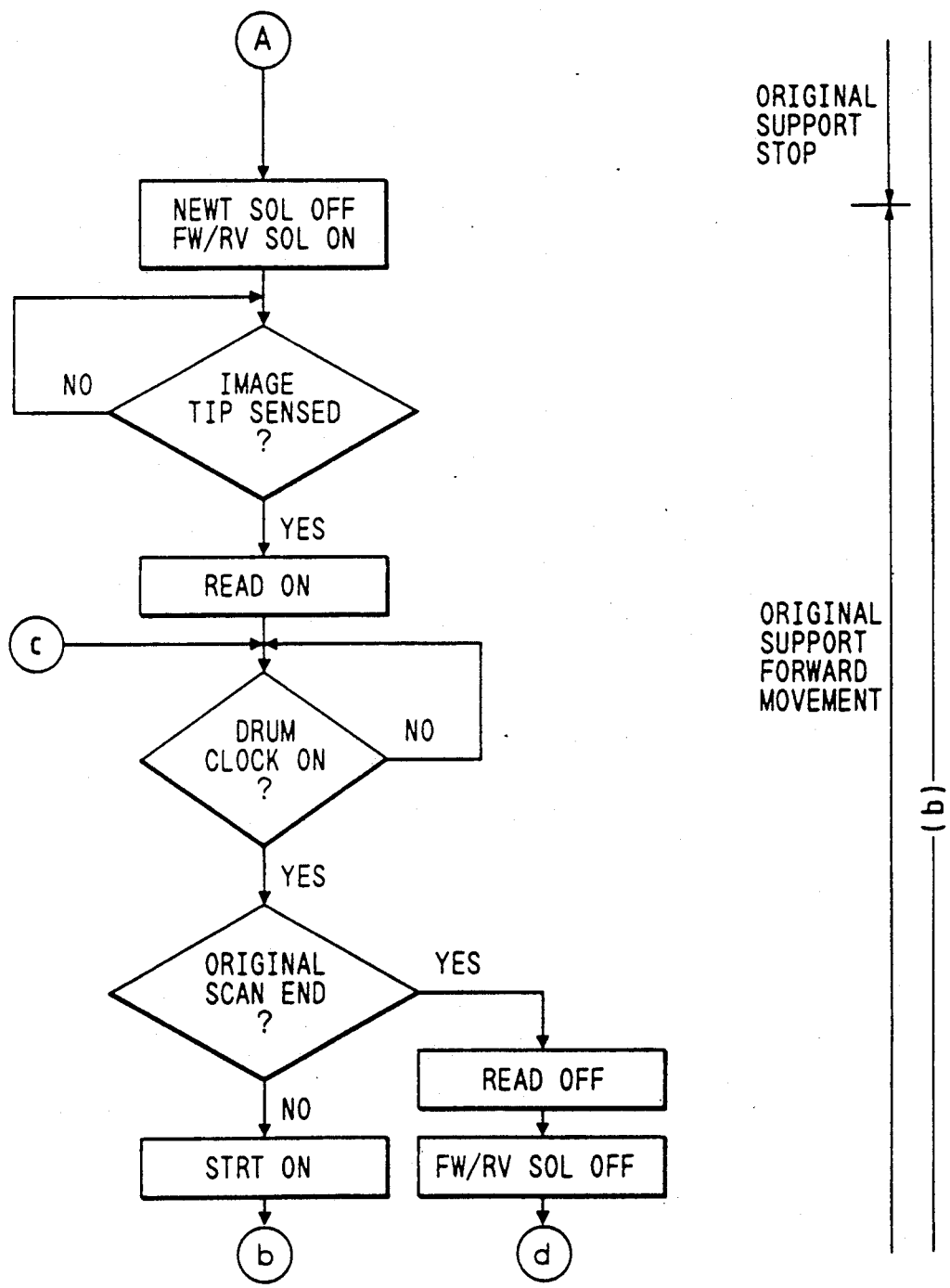
FIGS. 18A, consisting of FIGS. 18A-1 and 18A-2, and 18B are flow charts showing the control sequence of the image reader.
Figure 18B:
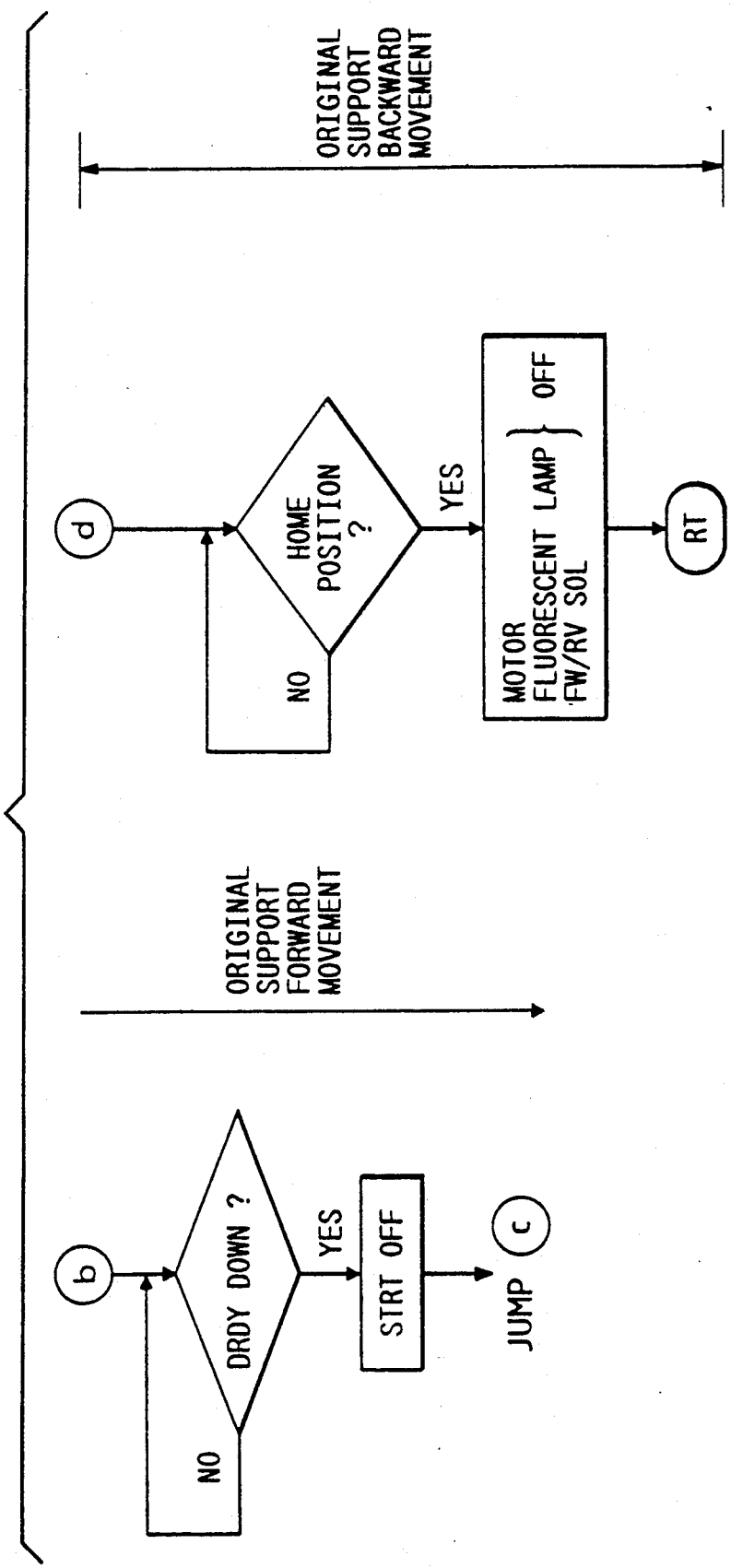

In the following there will be explained the sequence flow and the timing of the image reader, with reference to FIGS. 18A and 18B (flow charts of the main body), FIGS. 19A to 19C (flow charts of the cartridge) and FIG. 12A (timing chart).

Figures 2, 19A:
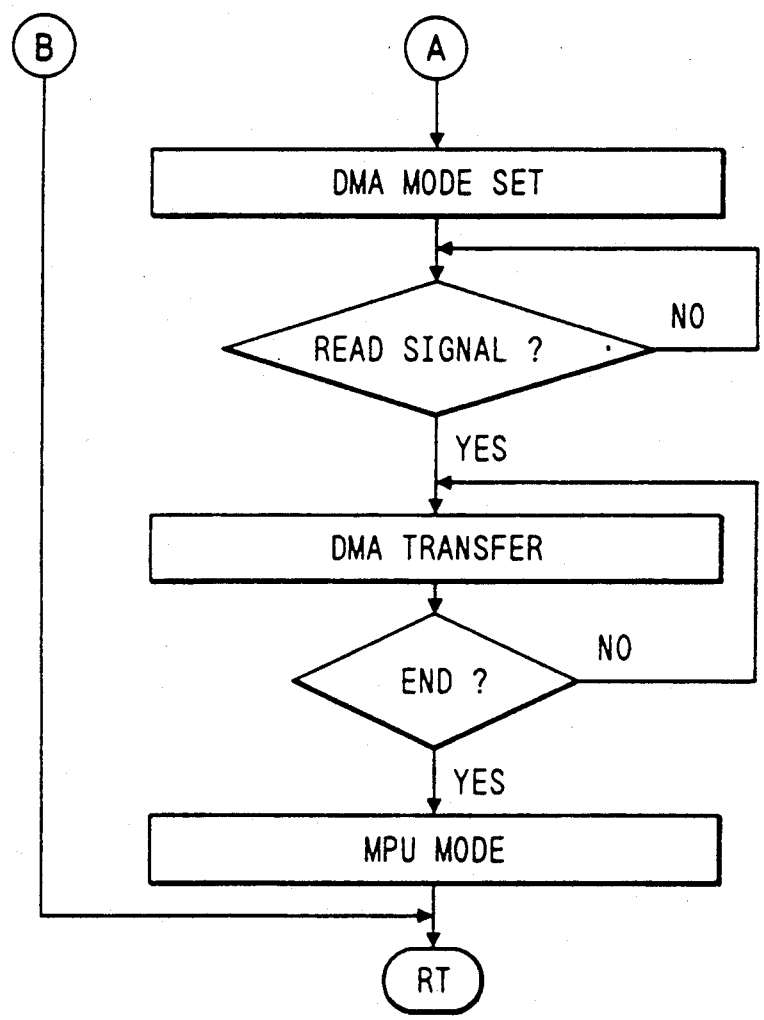
FIGS. 19A, consisting of FIGS. 19A-1 and 19A-2, 19B and 19C are flow charts showing the control sequence of image information processing.
Figure 19B:
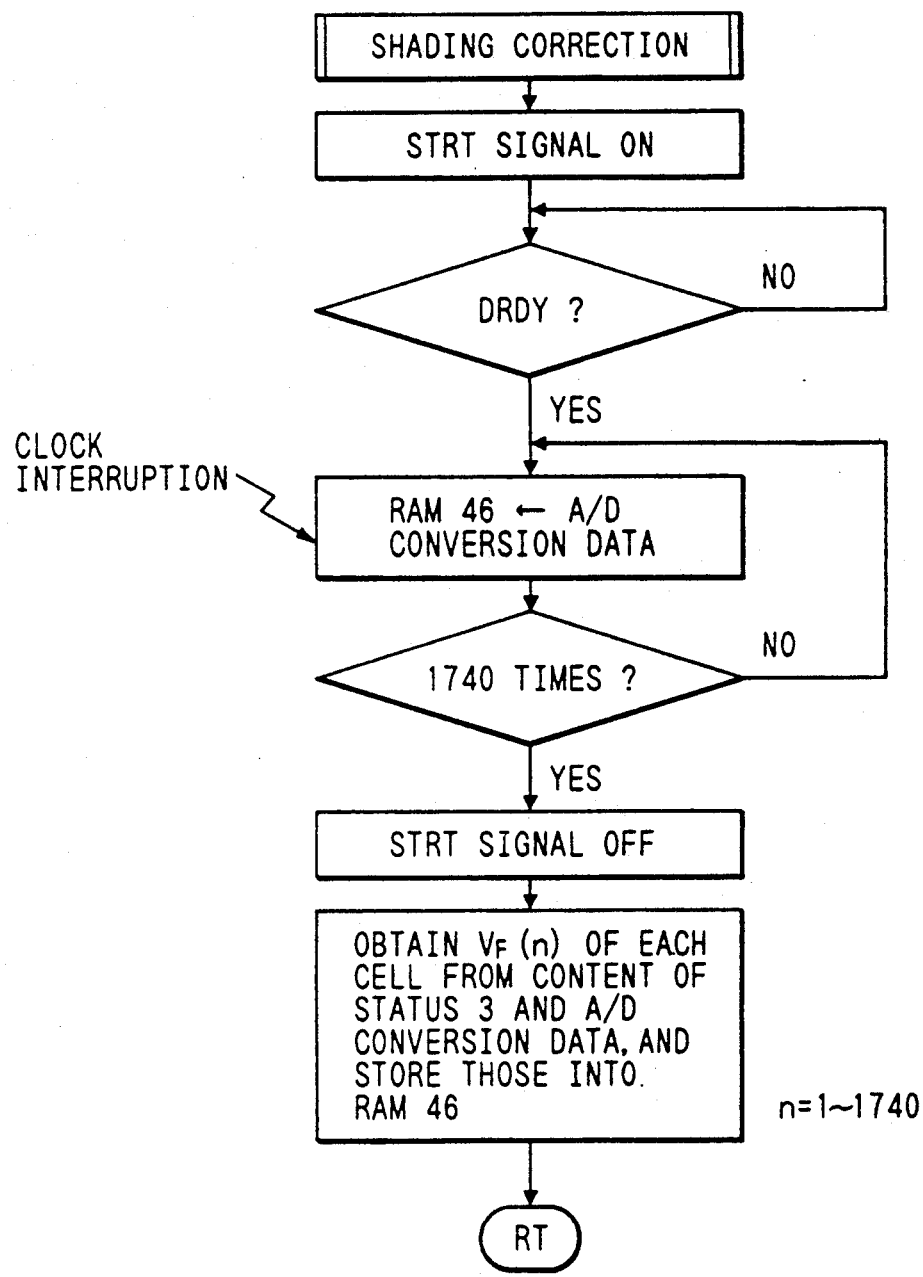
Figure 19C:
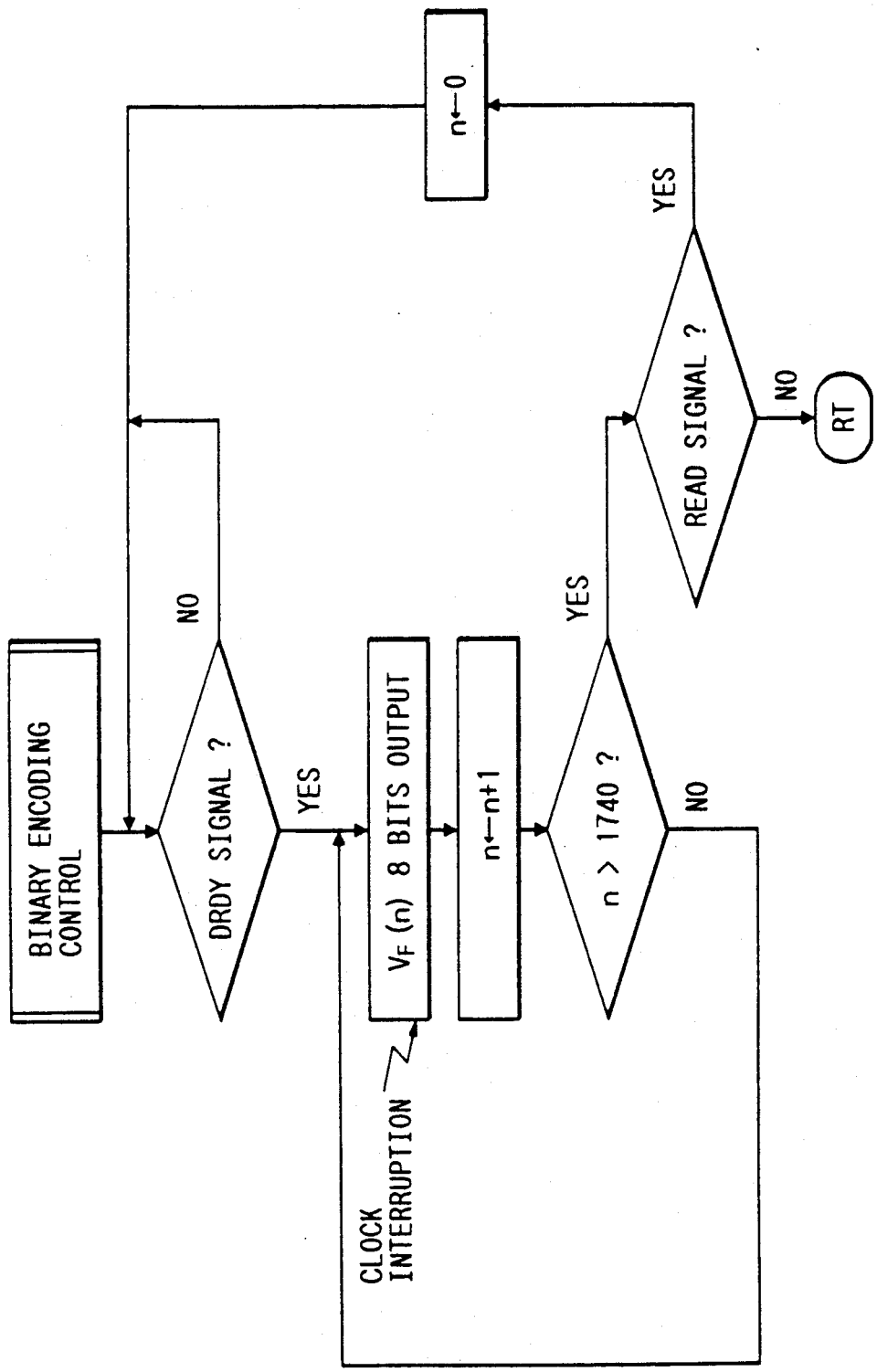

Upon receiving an image scanning command from the external equipment 140, the image reader cartridge II discriminates the state of the main body from the code STATUS0, and, in the absence of sheet jamming or abnormality in the heater control system and in the motor control system, turns on a scan request signal SCREQ (FIG. 19A(a)). In response to the controller 102 of the main body turns on a scan signal SCAN, thus activating the motor 110 and the fluorescent lamp 108. In response the original is reversed and returns to the start position. The driving of the original support table is mechanically cut off by the energization of the neutral solenoid 119, and the main body awaits, at said start position state, that the light intensity of the fluorescent lamp 108 reaches a second predetermined value. When the fluorescent lamp 108 reaches said predetermined light intensity by the light regulating circuit 107, the controller 102 of the main body sends a shading correction command to the MPU 132 of the reader cartridge. Said command is sent by the bit 2 of the code STATUS1 (FIG. 14C). The above-explained flow is shown in FIG. 18A(a). In this state the image sensor 30 receives the light reflected from a standard white board. In response to said command, the MPU 132 of the cartridge starts the shading correction, for correcting the sensitivity in the main scanning direction of the image reading system, including the image reading optical system and the image sensor. More specifically the fluorescent lamp used as the light source has a distribution in the light intensity along the axis thereof, and the imaging element array also has a distribution of the light transmittance. Furthermore the image sensor array in the image sensor unit 130 has fluctuation in sensitivity among different sensor elements. Consequently the density of the original image cannot be exactly judged unless the sensitivity in the main scanning direction is corrected over the entire image reading system. The shading correction shown in FIG. 9A is in practice conducted by a small system shown in FIG. 9B, including a sub microcomputer 148. The control sequence of this system is shown in FIG. 19B. The sub microcomputer 148 sends a start signal START to the image sensor unit 130, and, when the data ready signal DRDY is received, stores the A/D converted data of a line (1740 pixels) in a RAM 146. Then it determines the binary threshold level for each cell of the image sensor by calculation or from a table stored in the memory, based on the above-mentioned data and the content of the code STATUS3, namely based on the reference level information supplied from the main body and the data of already conducted A/D conversion on the light reflected from the standard white board, and stores said threshold level in the RAM 146. In the present embodiment, the threshold level for binary digitizing is determined by the regulating knob 141 of the display-operation unit 103 (FIG. 8), which is also used for density control for the analog copying cartridge I. In this manner it is rendered possible to simplify the display-operation unit and to reduce the cost thereof.

After the shading correction, the MPU 132 of the cartridge II sends the original scanning command EC2 (FIG. 14A) to the MPU of the main body, thereby preparing for the DMA transfer of the image information of an original to be started. The above-explained sequence is shown in FIG. 19A(b). In response to said command EC2, the main body resets the shading correction command bit and the scan signal, and turns off the neutral solenoid 119 and turns on the forward-/reverse solenoid 118, thereby advancing the original support table with a second speed. The second light intensity and the second speed are controlled by the sensitivity of the image sensor. When the leading end of the original reaches the exposure position by the advancement of the original support table, the image front end sensor 113 is turned on, whereby the controller 102 of the main body sends a reading start signal READ to the MPU 132 of the cartridge II. Then it turns on the start signal STRT at the upshift of the output pulse of the encoder for controlling the speed of the motor 110, and turns off said start signal STRT at the downshift of the data ready signal DRDY of the image sensor unit 130. After the original scanning, it turns off the signal READ, then the forward/reverse solenoid 118, and, when the original support table returns to the home position, turns off all the loads. The above-explained sequence is shown in FIG. 18A(b) and FIG. 18B. In the image reader mode explained above, the synchronization signal in the sub scanning direction for the image reading line sensor is obtained from the encoder pulses of a motor for the original scanning, or the pulses obtained by frequency division of said encoder pulses. It is therefore rendered possible to dispense with the exclusive timer for synchronization in the sub scanning direction in the conventional image reader, and to simplify the software. It is furthermore made possible to employ looser precision for the speed control of the motor, thereby reducing the cost of the motor control system, and to employ an AC motor which cannot be used in the conventional image reader.

On the other hand, in response to the READ signal from the controller 102 of the main body, the MPU 132 of the cartridge stores image information of a page in a memory 138, in synchronization with clock signals (FIG. 19A(c)).

Figure 9B:
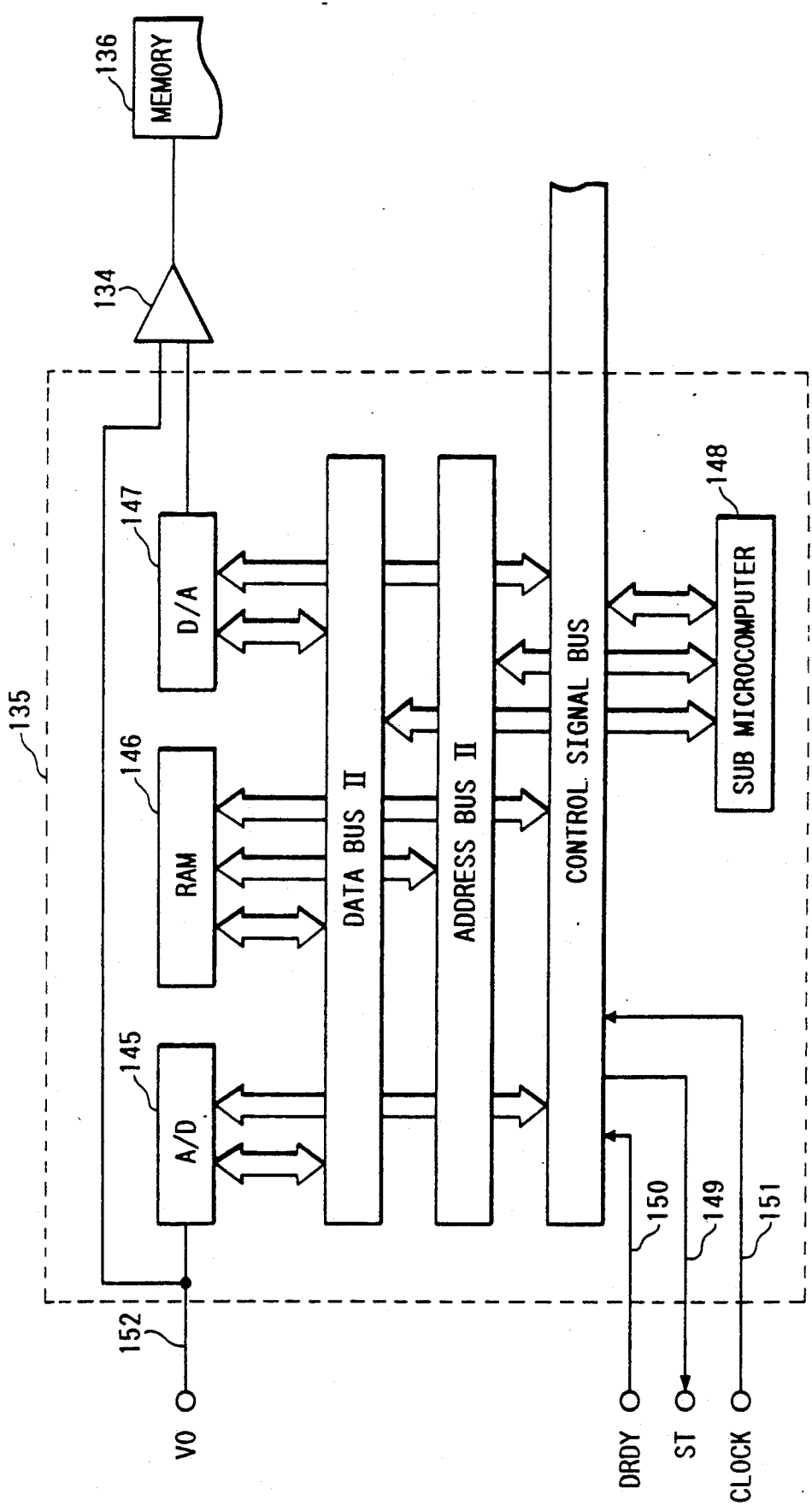
FIG. 9B is a block diagram of a shading correction circuit shown in FIG. 9A.

The analog output signal $V_0$ from the image sensor unit is binary digitized by a small system shown in FIG. 9B and having the sub microcomputer 148. More specifically, the analog output signal $V_0$ (152) is binary digitized by successive comparison, in a comparator 134, in synchronization with clock signals 151, with the D/A converted voltage from a D/A converter 147 of the aforementioned reference voltage $V_{F(n)}$ (n=1−1740) obtained in the shading correction. The corresponding control sequence is shown in FIG. 19C.

In the foregoing there has been explained the control, related to the block diagram in FIG. 9 and the timing chart shown in FIG. 12, when the image reader cartridge II is loaded in the main body.

(3) Printer cartridge III

Figure 10A:
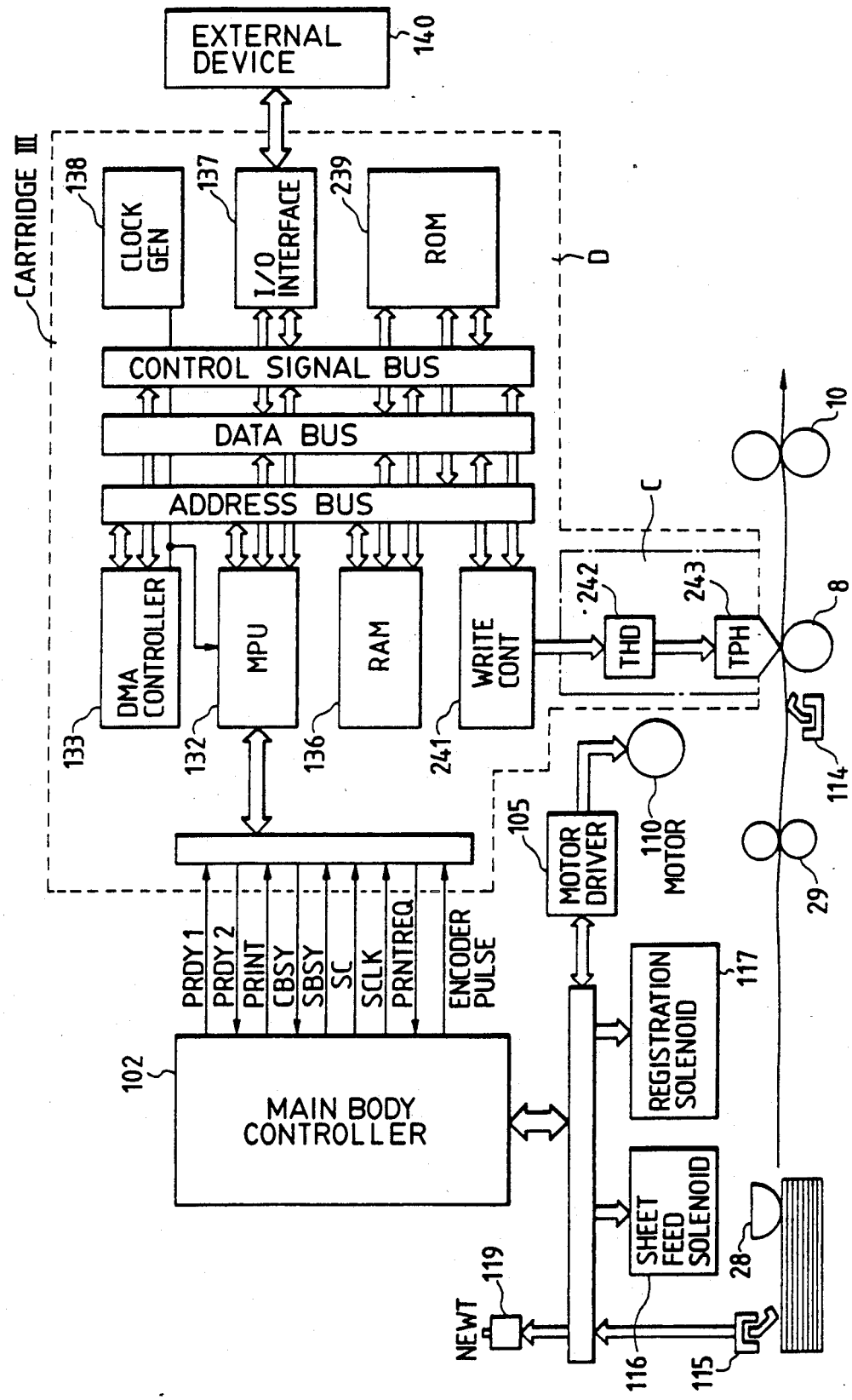
FIG. 10A is a block diagram of the printer cartridge.
Figure 10B:
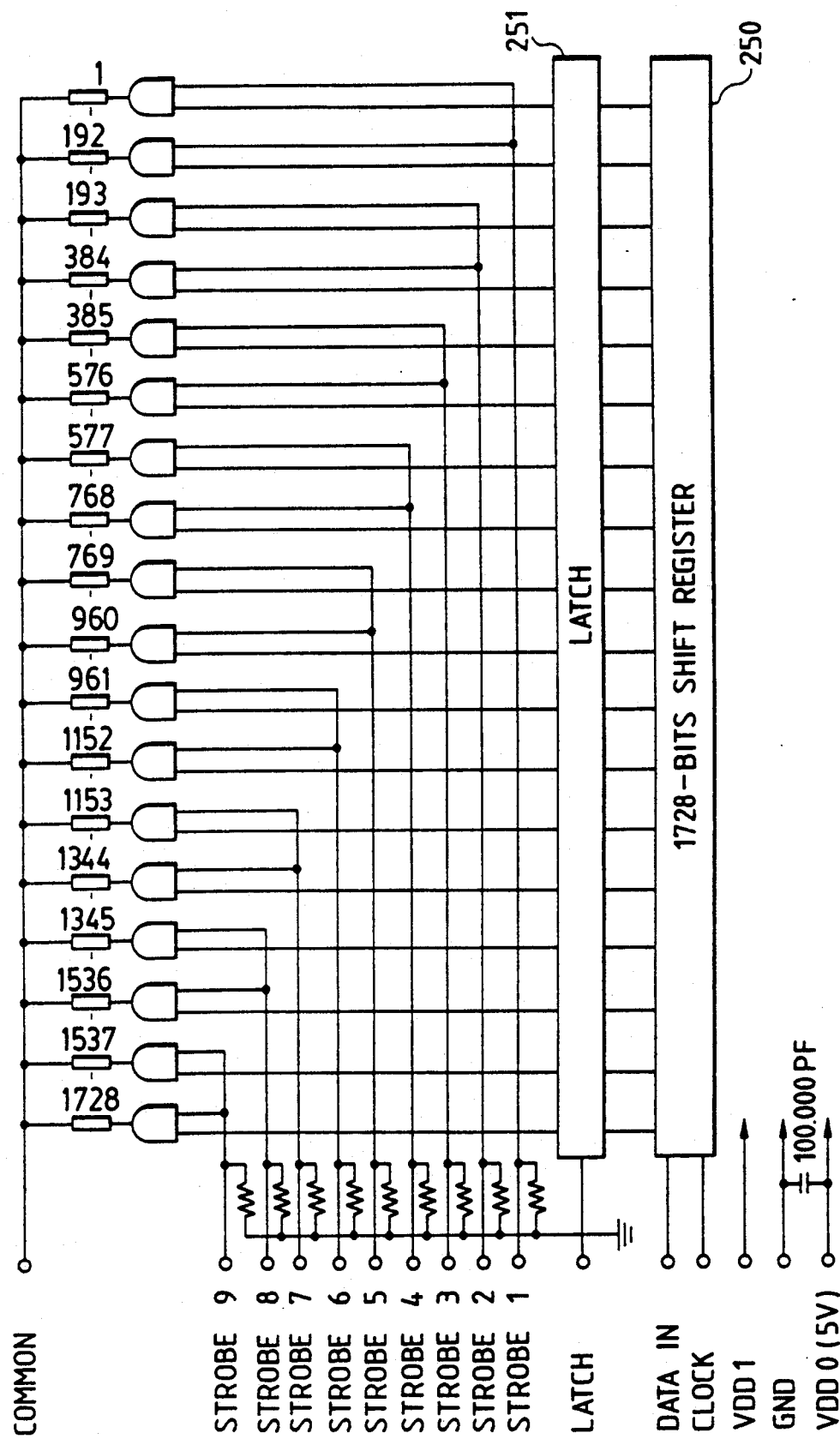
FIG. 10B is a block diagram of a thermal head driver shown in FIG. 10A.
Figure 13B:
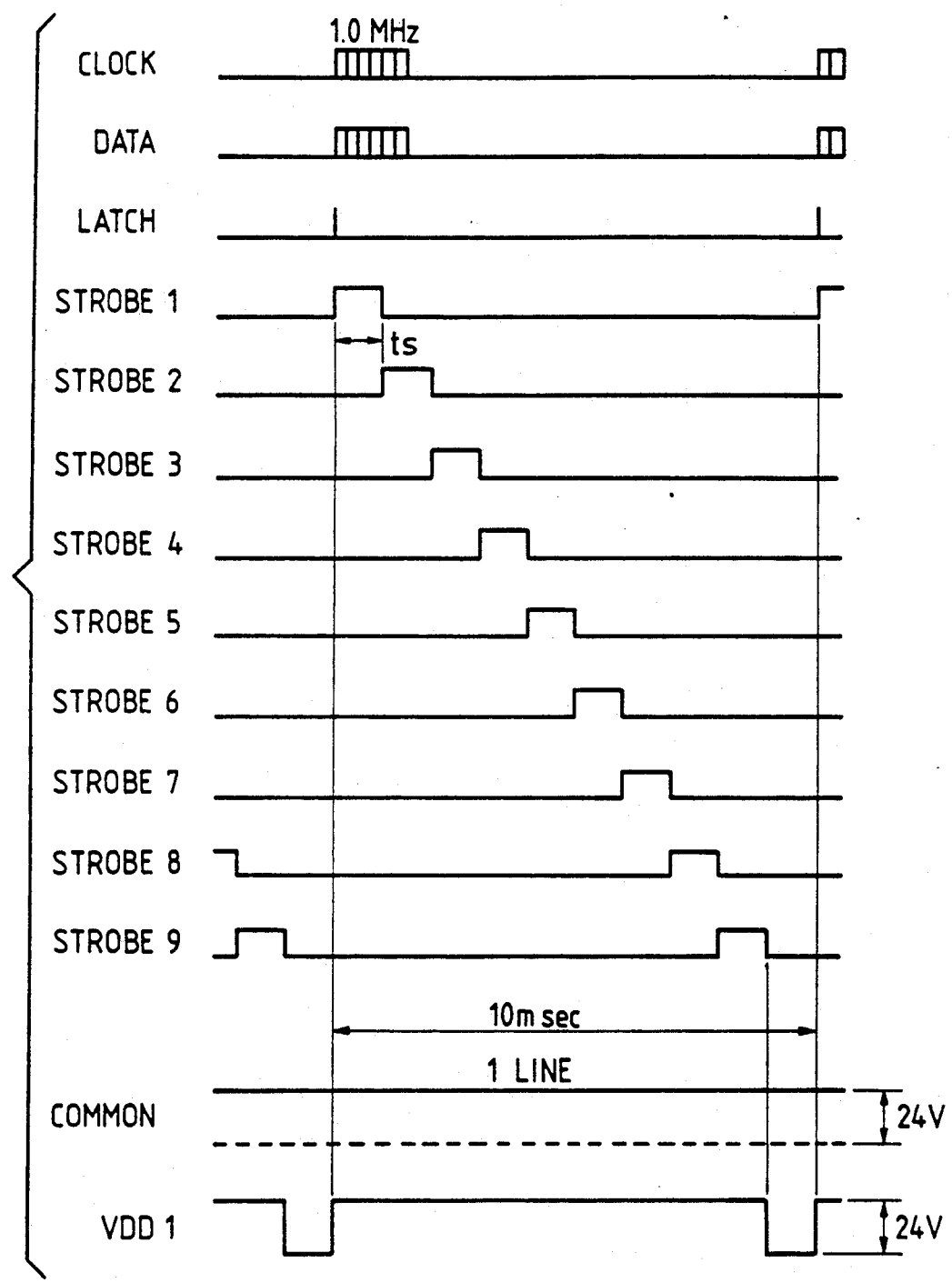
FIG. 13B is a timing chart showing thermal head control signals.

FIG. 10A is a block diagram when the printer cartridge is loaded in the main body, wherein same components as those in FIG. 9A are represented by same numbers or symbols. In this case the cartridge is provided with a MPU 132, a DMA controller 133, a memory 236, an I/O interface 137, a thermal head 243, a thermal head driver 242, and a writing controller 241. FIG. 10B shows the structure of the thermal head driver 242. The thermal head 243 of a resolution of 8 pels and a width of 216 mm has 1728 dots in total, which are divided into nine blocks and are controlled by nine strobe signals on time-divided basis, in order to limit the DC power supply current. The timing of various signals is shown in FIG. 13B. The signals STROBE, LATCH and VDDI are supplied from the writing controller 241. The data of a line are transferred from a memory 236 to a shift register 250 shown in FIG. 10B in the DMA mode.

Figures 20, 20A:
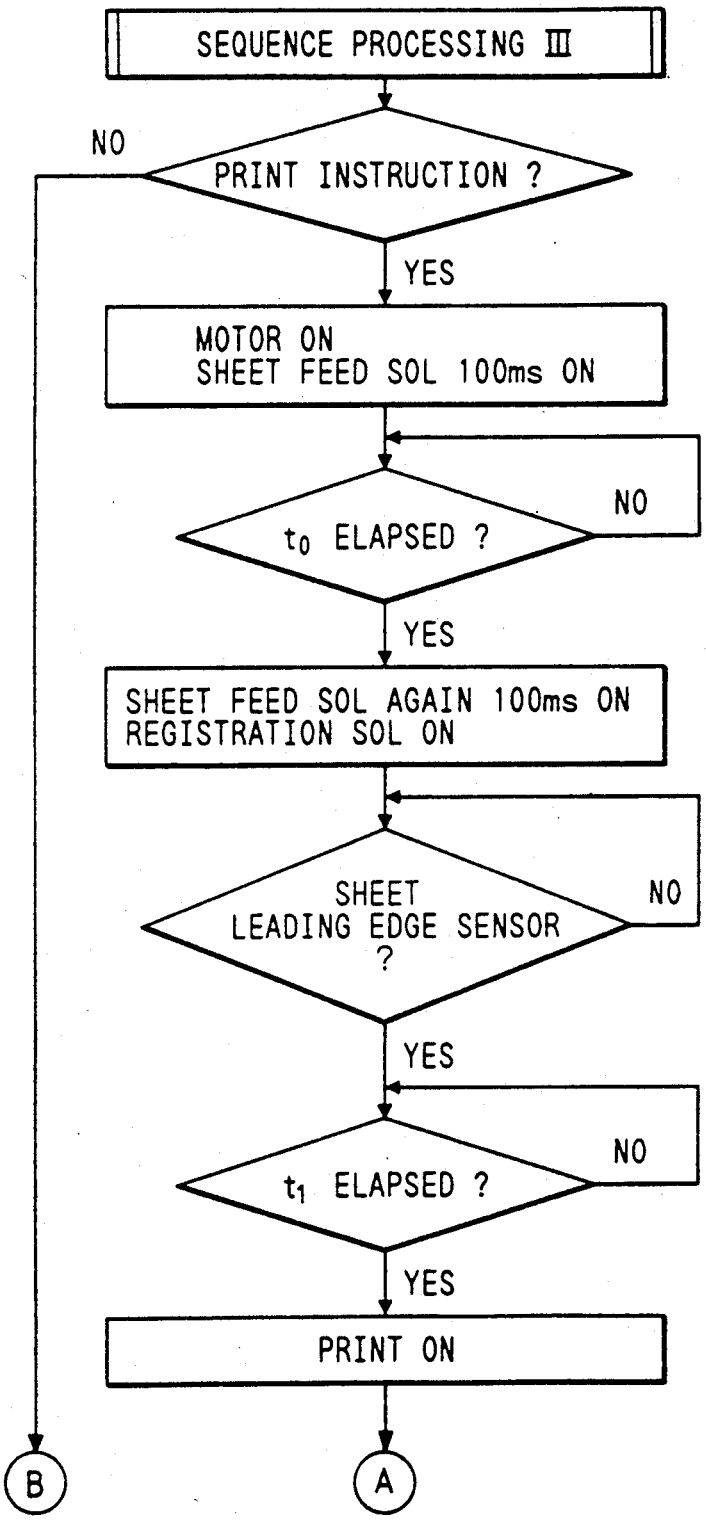
FIG. 20, consisting of FIGS. 20A and 20B, is a flow chart showing the control sequence of the printer; ·
Figure 20B:
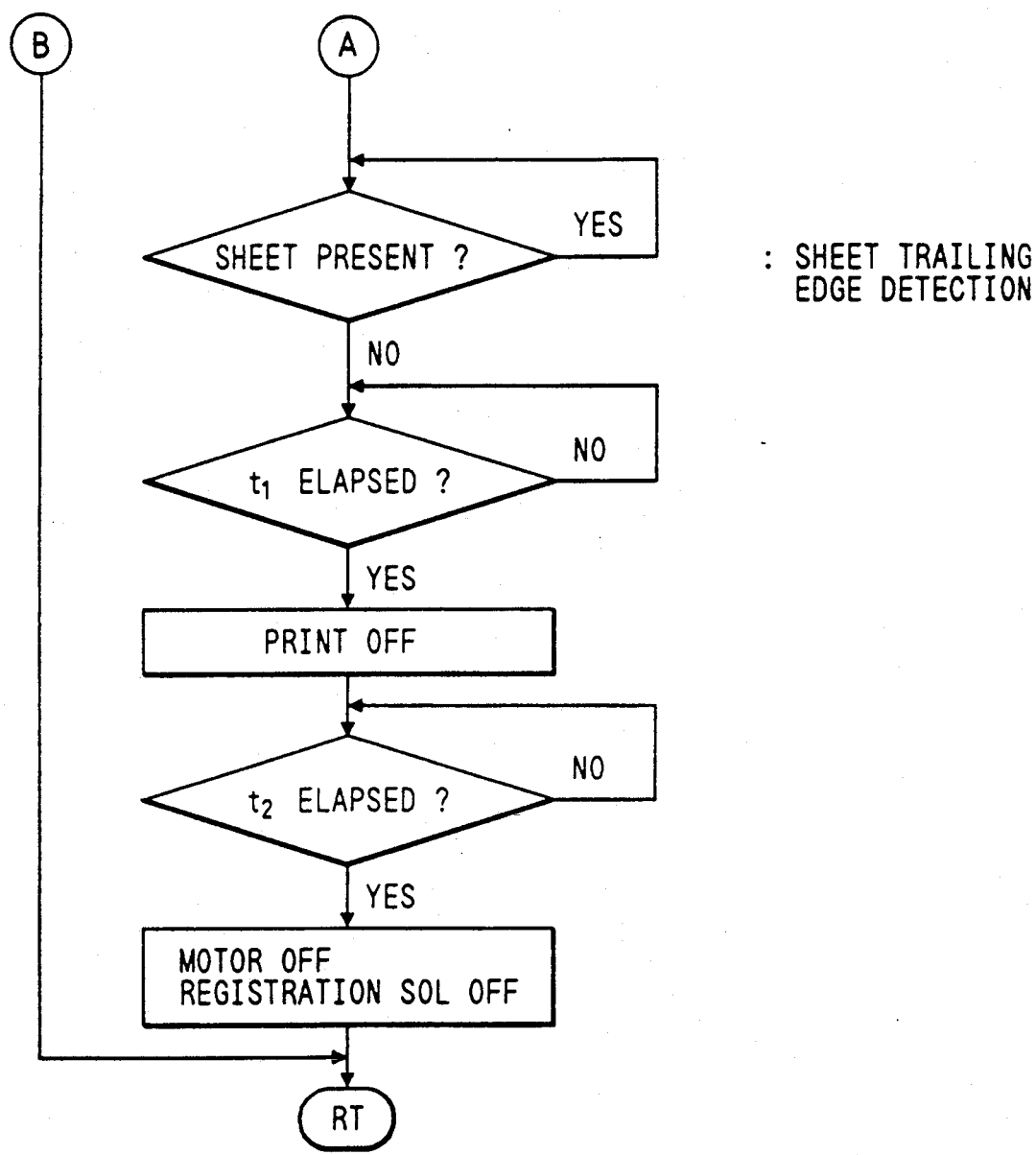

FIG. 13A shows the interface signals between the main body and the printer cartridge in the printer mode and the timing of functions of the main body in said mode. The timing control shown in FIG. 13A will be explained with reference to a flow chart of the main body shown in FIG. 20 and a flow chart of the cartridge shown in FIG. 21.

Figure 21A:
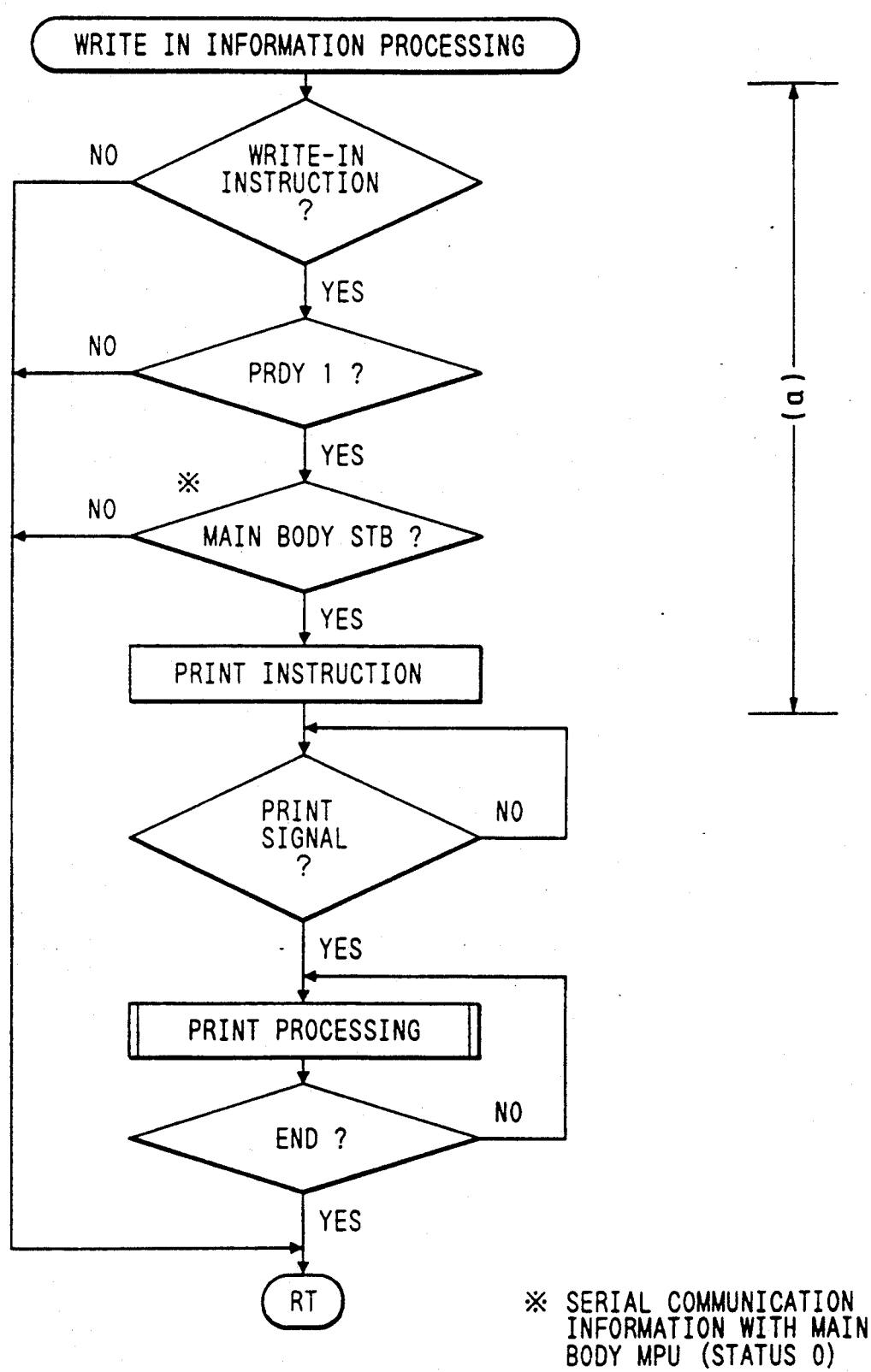
FIG. 21A is a flow chart showing the control sequence of recording information processing.

When a writing command is sent from an external equipment to the cartridge III, the cartridge checks the state of the main body, and releases a print command if the main body is in the proper state (FIG. 21A). In response the main body turns on the motor 110 and the sheet feeding solenoid 116, and turns on said solenoid 116 again after a predetermined time when the sheet reaches the registration rollers 129. The procedure of sheet feeding is same as in case of the cartridge I explained before. Upon arrival of the sheet at the sheet front end sensor 114 shown in FIG. 10A, the PRINT signal is turned on after a predetermined time $t_1$ (FIG. 13A). Said time $t_1$ corresponds to the period from the arrival of front end of the sheet at the sensor 114 to the arrival of said front end at the thermal head 243. Simultaneously with the start of the PRINT signal, the main body transmits the encoder pulses from the motor 110 to the cartridge, as the synchronization signal for writing (FIG. 13A). The printing operation is thus started. After a predetermined period $t_1$ from the passing of the rear end of the sheet through the sensor 114, the PRINT signal is turned off. Said PRINT signal terminates the function of the thermal head writing controller 241 at the moment of passing of the rear end of the sheet. However said signal is only effective for small-sized sheets but is meaningless for ordinary sized sheet (FIG. 21). After the print signal is turned off, the motor 110 and the registration solenoid 117 are turned off at the timing of discharge of the sheet from the main body through the fixing rollers 10 (indicated by $t_2$ shown in FIG. 13A). In the above-explained thermal printer mode, the writing control for a line of the thermal head is conducted in synchronization with the output pulses from the encoder of the sheet driving motor, so that the software can be simplified in comparison with the synchronization control with an exclusive timer. Also no particularly high precision is required in the speed control of the driving motor of the main body, so that the cost of the motor control system can be significantly reduced, and there may be employed an AC motor that cannot be used in the conventional printers.

Figure 21B:
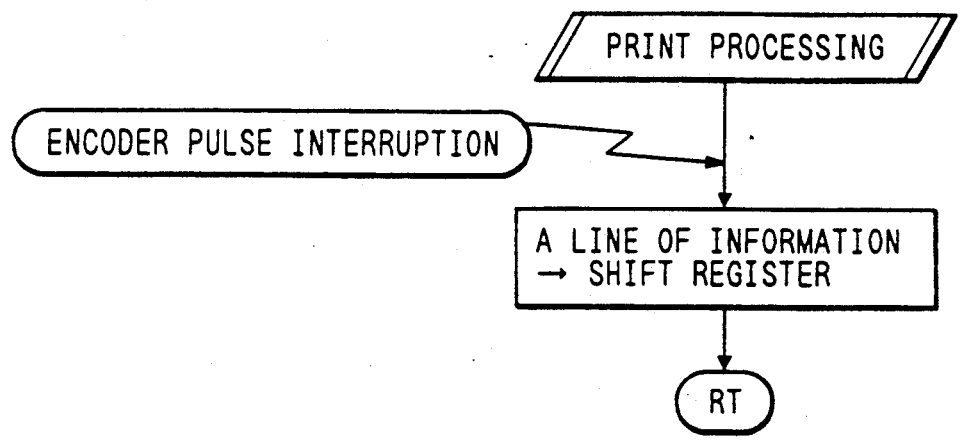
FIG. 21B is a flow chart showing the control sequence of printing.
Figure 21C:
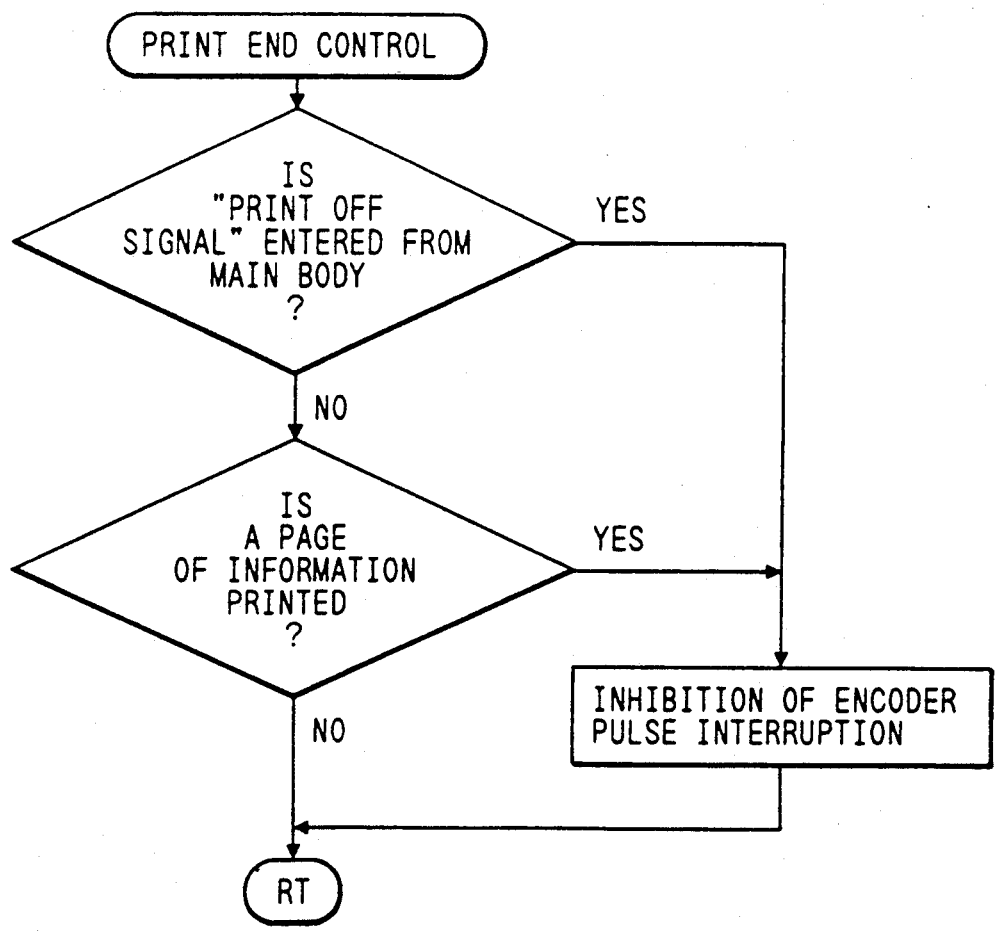
FIG. 21C is a flow chart showing the control sequence of the print end process.

On the other hand, in response to the print signal from the main body, the cartridge III effects the printing operation of a page, by printing data of a line, in succession, in synchronization with encoder pulses (FIG. 21B). Upon entry of a print-off signal from the main body or after the printing of data of a page, the interruption process for the encoder pulses is prohibited (FIG. 21C). In the printing operation, if the data from the external equipment 140 are code data, data for converting said code to characters are stored in a ROM 239 shown in FIG. 10A, and the data of a line are transmitted at a time to the thermal head driver 242 shown in FIG. 10B, under the control of the MPU 232.

If the signal from said external equipment 140 is video signal, all the image data or a part thereof is stored in the RAM 136, and the data of a line is supplied at a time to the thermal head driver 242.

The function and the control explained above are conducted when the printer cartridge shown in FIG. 10A is loaded in the main body.

The thermal fixing means is turned off when the printer cartridge III is loaded, and the writing operation is enabled only when the temperature of said fixing means is below a predetermined temperature, in order to avoid undesirable effect by heat on the thermal recording sheet or the thermal transfer recording sheet. Also the fluorescent lamp is turned off. It is therefore possible to utilize the power for the fluorescent lamp to the thermal head driver, thereby reducing the capacity of the DC power supply. Furthermore the high voltage unit in the main body is turned off, thereby preventing the high-voltage leakage or the erroneous functions.

(4) Reader-printer cartridge IV

The reader-printer cartridge IV is basically composed of the combination of the reader cartridge II and the printer cartridge III, and is provided therein with an image sensor unit 130 (FIG. 9A) and a thermal head 243

(FIG. 10A). Also the control circuit is so constructed as to achieve image reading and image recording. In this case the digital copying of the original image by transmitting the information obtained with the image sensor by scanning the original image directly to the thermal head driver 242 (FIG. 10A).

As explained in the foregoing, there is provided a system capable of digital image reading and/or printing of externally supplied image or character information in addition to the conventional analog copying function, by utilizing four different cartridges for a main body. In the foregoing description, the reader cartridge II shown in FIG. 9A, for example, is composed of a block A containing the image sensor unit and a block B for information processing, but it is also possible to leave the block A only in the cartridge and to form the block B as an external unit, in order to limit the dimension of the cartridge.

Also in case of the printer cartridge III, it is possible to provide the thermal head 243 and the thermal head driver 242, shown in FIG. 10A, in the cartridge and to place other control circuits in an external unit.

Also in the foregoing description, the thermal printer is employed in the printer cartridge, but there may be employed other printers such as an ink jet printer.

It is therefore rendered possible to obtain a multifunction image recording apparatus capable of achieving the functions of the analog electrophotographic copying machine, an image reader, a thermal printer etc. by selectively loading two or more different cartridges on a common main body. The apparatus can therefore function as a terminal device for a host equipment such as a personal computer by mere replacement of cartridge, without increase in the dimension or in the cost, in comparison with the stand-alone copying machine.

What is claimed is:

1. An image recording apparatus comprising:
   a first cartridge detachably mountable in a holding portion of said apparatus and provided with recording means for recording an image on a sheet by an electrophotographic process;
   guide means for loading or detaching said first cartridge or a second cartridge;
   a second cartridge loadable in the holding portion of said apparatus in place for said first cartridge and provided with a thermal head for recording an image on a sheet;
   roller means for transferring an image formed on a photosensitive member to the sheet when said first cartridge is loaded,
   wherein said roller means is used as a platen for pushing out the sheet in the direction of the thermal head when said second cartridge is loaded.

2. An apparatus according to claim 1, wherein said apparatus comprises sheet transport means for transporting said sheet, wherein said sheet transporting means is commonly utilized when said first cartridge is loaded and when said second cartridge is loaded.

3. An apparatus according to claim 2, wherein the sheet transport speed of said sheet transporting means is made different when said first cartridge is loaded and when said second cartridge is loaded.

4. An apparatus according to claim 2, wherein said apparatus effects the recording operation of a line in synchronization with the function of a drive source for said sheet transporting means.

5. An apparatus according to claim 1, wherein the image density when said first cartridge is loaded and that when said second cartridge is loaded are conducted by common regulating means.

6. An apparatus according to claim 2, further comprising detection means for detecting a failure in sheet transportation at a predetermined position on the sheet transport path of said sheet transporting means when said first cartridge is loaded, wherein the start of recording operation when said second cartridge is loaded is controlled by the output of said detection means.

7. An image recording apparatus according to claim 1, further comprising
   display means for displaying data indicative of the status of said apparatus,
   wherein the data displayed by said display means in the case where the first cartridge is loaded is different from that in the case where the second cartridge is loaded.

8. An apparatus according to claim 7, wherein said display means displays data indicative of the status of said apparatus, including data indicative of apparatus error.

9. An apparatus according to claim 1, further comprising first display means for displaying which one of the first or second cartridge is loaded.

10. An apparatus according to claim 1, further comprising second display means for displaying that no cartridge is loaded.

11. An apparatus according to claim 9 where said first display means displays whether said first or second cartridge provides recording means for copying, reading, printing, or reading and printing.

12. An apparatus according to claim 10, where said second display means also displays messages as a result of a diagnosis of the apparatus or operational status of said first or second cartridge.

13. An image recording apparatus comprising:
   original scanning means for scanning an original image by light exposure;
   a first cartridge detectably loadable in a holding portion of said apparatus and provided with recording means for recording an image on a sheet by an electrophotographic process, thereby reproducing, on said sheet, an image of the original image scanned by said original scanning means;
   a second cartridge loadable in the holding portion of said apparatus in place for said first cartridge and provided with converter means for reading image information of the original image and converting the same into an electrical signal and an interface for outputting the electrical signal to an external device;
   guide means for loading or detaching said first or second cartridge into or from said holding portion;
   control means for enabling the copying and reading of the original image utilizing commonly said original scanning means when said first cartridge is loaded and when said second cartridge is loaded; and
   an operational panel including regulating means for manually regulating a density of the copied image when said first cartridge is loaded;
   a developing bias is controlled in accordance with a signal from the regulating means when said first cartridge is loaded, and wherein a reference level for conversion by the converter means is determined in accordance with a signal from said regulating means when said second cartridge is loaded.

14. An apparatus according to claim 13, wherein said operational panel further comprises a plurality of key input means for manually inputting processing instructions, and wherein said control means starts the scanning by the original scanning means in response to the operation instruction of one of the key input means when the first cartridge is loaded, and wherein said control means starts the scanning by the original scanning means in response to a read instruction from the external device when the second cartridge is loaded.

15. An apparatus according to claim 14, wherein the instruction inputted by one of the key input means is effective only when the first cartridge is loaded and non-effective when the second cartridge is loaded.

16. An apparatus according to claim 13, further comprising first display means for displaying which one of the first or second cartridges is loaded.

17. An apparatus according to claim 16, further comprising second display means for displaying that no cartridge is loaded.

* * * * *